(12) United States Patent
Okubo et al.

(10) Patent No.: US 11,183,910 B2
(45) Date of Patent: Nov. 23, 2021

(54) SQUIRREL CAGE INDUCTION MOTOR FOR VEHICLE

(71) Applicant: Mitsubishi Electric Corporation, Tokyo (JP)

(72) Inventors: Tatsuro Okubo, Tokyo (JP); Hideo Terasawa, Tokyo (JP)

(73) Assignee: MITSUBISHI ELECTRIC CORPORATION, Chiyoda (JP)

(*) Notice: Subject to any disclaimer, the term of this patent is extended or adjusted under 35 U.S.C. 154(b) by 161 days.

(21) Appl. No.: 16/480,402

(22) PCT Filed: Mar. 6, 2017

(86) PCT No.: PCT/JP2017/008817
§ 371 (c)(1),
(2) Date: Jul. 24, 2019

(87) PCT Pub. No.: WO2018/163251
PCT Pub. Date: Sep. 13, 2018

(65) Prior Publication Data
US 2019/0386550 A1      Dec. 19, 2019

(51) Int. Cl.
*H02K 17/16* (2006.01)
*H02K 5/24* (2006.01)
*H02K 7/00* (2006.01)

(52) U.S. Cl.
CPC ............. *H02K 17/165* (2013.01); *H02K 5/24* (2013.01); *H02K 7/006* (2013.01); *H02K 2213/03* (2013.01)

(58) Field of Classification Search
CPC .................. H02K 17/16; H02K 17/165
See application file for complete search history.

(56) References Cited

U.S. PATENT DOCUMENTS

| 2,192,841 A * | 3/1940 | Rendell ................ H02K 17/165 310/211 |
| 2,242,339 A * | 5/1941 | Baudry .................. H02K 17/16 310/211 |
| 2012/0267978 A1* | 10/2012 | Caruso ................ H02K 17/165 310/211 |

FOREIGN PATENT DOCUMENTS

| JP | S52019611 U | 2/1977 |
| JP | S5295005 U | 7/1977 |

(Continued)

OTHER PUBLICATIONS

Nagashima, Machine Translation of JP10117468, May 1998 (Year: 1998).*

(Continued)

*Primary Examiner* — Quyen P Leung
*Assistant Examiner* — Eric Johnson
(74) *Attorney, Agent, or Firm* — Buchanan Ingersoll & Rooney PC

(57) ABSTRACT

A rotor includes a rotor core having slots on an outer periphery to receive rotor bars, short-circuit rings bonded to ends of the rotor bars to electrically connect the rotor bars together, core retainers located across the rotor core in a direction along a rotating shaft, and a deformation prevention portion located between each short-circuit ring and the rotor core. The deformation prevention portion is fixed to the short-circuit ring and to at least a portion of at least one rotor bar to reduce bending deformation of the portion of the rotor bar in a direction tangent to an outer peripheral surface of a portion of the rotor core of the rotor bar.

20 Claims, 17 Drawing Sheets

(56) References Cited

FOREIGN PATENT DOCUMENTS

| | | |
|---|---|---|
| JP | S56106072 U | 8/1981 |
| JP | S57104743 U | 6/1982 |
| JP | S57156643 A | 9/1982 |
| JP | S58115855 U | 8/1983 |
| JP | S59070170 A | 4/1984 |
| JP | S59138339 U | 9/1984 |
| JP | S62135245 A | 6/1987 |
| JP | S637976 U | 1/1988 |
| JP | H04002966 U | 1/1992 |
| JP | H0491649 A | 3/1992 |
| JP | H09331659 A | 12/1997 |
| JP | 10117468 A * | 5/1998 |
| JP | 2004248413 A | 9/2004 |
| JP | 2004304930 A | 10/2004 |

OTHER PUBLICATIONS

International Search Report (PCT/ISA/210) dated May 23, 2017, by the Japan Patent Office as the International Searching Authority for International Application No. PCT/JP2017/008817.
Written Opinion (PCT/ISA/237) dated May 23, 2017, by the Japan Patent Office as the International Searching Authority for International Application No. PCT/JP2017/008817.
Notification of Reasons for Refusal in corresponding JP Patent Application No. 2019-503842 dated May 14, 2019, with English machine translation.

* cited by examiner

SQUIRREL CAGE INDUCTION MOTOR FOR VEHICLE

TECHNICAL FIELD

The present disclosure relates to a squirrel cage induction motor for railway vehicles.

BACKGROUND ART

A squirrel cage induction motor is used as a main motor for driving an electric railway vehicle. A squirrel cage rotor conductor included in a squirrel cage induction motor includes a rotor core having slots on the outer periphery parallel to a rotating shaft, rod-like rotor bars received in the slots, and short-circuit rings as annular conductors bonded on two ends of the rotor bars. An alternating current flows through a stator coil received in a slot on a stator core thereby generating a rotating magnetic field. The squirrel cage rotor conductor interlinks with the rotating magnetic field thereby generating an induced electromotive voltage. The induced electromotive voltage causes an induced current to flow through the squirrel cage rotor conductor forming a closed circuit, and a magnetic pole is generated in the rotor core. The magnetic pole in the rotor core and the magnetic pole in the rotating magnetic field interact with each other subjecting the rotor core to a force in a direction tangent to the outer peripheral surface of the rotor core. This force is the output torque from the rotating shaft.

Each rotor bar and the corresponding short-circuit ring are bonded together by silver brazing or welding. When electrical contact between the rotor bar and the short-circuit ring is insufficient due to insufficient silver brazing or welding, the rotor bar can vibrate and break due to electromagnetic vibration or rotation vibration. A squirrel cage induction motor described in Patent Literature 1 includes a fillet portion on a bottom contact portion in an end face of a short-circuit ring facing a rotor core to be in contact with rotor bars. The fillet portion on the short-circuit ring is then bonded to the rotor bar by silver brazing or welding. The fillet portion forming on the short-circuit ring produces additional fillets for silver brazing or welding with the rotor bar on the both sides and the bottom of the fillet portion. This increases the reliability of silver brazing or welding, and also reduces stress concentration on the maximum stress point of the rotor bar, thus preventing the rotor bar from breaking.

CITATION LIST

Patent Literature

Patent Literature 1: Unexamined Japanese Patent Application Kokai Publication No. H4-91649

SUMMARY OF INVENTION

Technical Problem

An alternating current voltage applied to the induction motor used as a main motor is a rectangular wave voltage resulting from conversion from a direct current to an alternating current by an inverter. The alternating current that flows through the stator coil thus contains harmonic components. Therefore, a rotating magnetic field that is generated by the stator, an induction current that flows through the squirrel cage rotor conductor, and a torque that is output from the rotor shaft also contain harmonic components. The output torque varies due to harmonic frequency called torque ripple.

Rotation speed of the rotor core contains minute fluctuations that occur with the same frequency as the torque ripple. The short-circuit ring bonded to the rotor bar has torsional vibrations relative to the rotor core with the same frequency as the torque ripple. The torsional vibrations are minute vibrations. Thus, the rotor bar bonded to the short-circuit ring is subjected to stress that is sufficiently small. However, when the frequency of the torque ripple matches the torsional natural frequency of the rotor conductor, the rotor conductor resonates and receives excess stress.

To prevent the frequency of the torque ripple from matching the torsional natural frequency of the rotor conductor, the torsional natural frequency of the rotor conductor is set to a sufficiently high value. However, the frequency of the torque ripple can match the torsion natural frequency of the rotor conductor as the rotor conductor deteriorates over time, and the rotor conductor can receive excess stress. Also, a squirrel cage induction motor used as a main motor for driving a railway vehicle may allow an alternating current with varying fundamental frequencies (inverter frequencies) to flow through a stator coil, thus also causing varying torque ripple frequencies. Thus, the torsional natural frequency of the rotor conductor is to be set to prevent the frequency of the torque ripple from matching the torsional natural frequency of the rotor conductor although the torque ripple frequency varies.

In consideration of the aforementioned circumstances, an objective of the present disclosure is to reduce the likelihood of rotor bars being subjected to excess stress in a squirrel cage induction motor for driving a railway vehicle.

Solution to Problem

In order to attain the aforementioned objective, a squirrel cage induction motor for a vehicle according to the present disclosure includes a rotating shaft supported in a rotatable manner, a rotor fitted on the rotating shaft and rotatable integrally with the rotating shaft, and a stator facing an outer peripheral surface of the rotor across a space. The rotor includes a rotor core, rotor bars, a pair of short-circuit rings, a pair of core retainers, and a deformation prevention portion. The rotor core is fitted on the rotating shaft, is a cylinder coaxial with the rotating shaft, and has slots on an outer periphery of the cylinder extending parallel to the rotating shaft. The rotor bars are conductive and each received in one of the slots on the outer periphery of the rotor core, and each have two ends in a direction parallel to the rotating shaft protruding outwardly from the rotor core. The pair of short-circuit rings are conductive and have respective main surfaces facing each other across the rotor bars in a direction parallel to the rotating shaft, and each bonded to the ends of the rotor bars to electrically connect the rotor bars together. Each short-circuit ring has an annular cross section perpendicular to the rotating shaft. The pair of core retainers are located across the rotor core in a direction along the rotating shaft to reduce movement and deformation of the rotor core in the direction along the rotating shaft. Each core retainer has an annular cross section perpendicular to the rotating shaft. The deformation prevention portion is located between a corresponding one of the short-circuit rings and the rotor core. At least part of the deformation prevention portion faces an outer peripheral surface of a corresponding one of the core retainers. The deformation prevention portion is fixed to the corresponding one of the short-circuit rings and to at least a portion of at least one of the rotor bars to reduce bending deformation of the at least a portion of the at least one of the rotor bars in a direction tangent to an outer peripheral surface of the rotor core.

Advantageous Effects of Invention

The squirrel cage induction motor for a vehicle according to the present disclosure reduces bending deformation of at least a portion of rotor bars in a direction tangent to the outer peripheral surface of the rotor core to reduce the likelihood of the rotor bars being subjected to excess stress.

DESCRIPTION OF EMBODIMENTS

Embodiments of the present disclosure are described below in detail with reference to the drawings. Throughout the drawings, components that are the same or equivalent are assigned the same reference signs.

Embodiment 1

Figure 1:
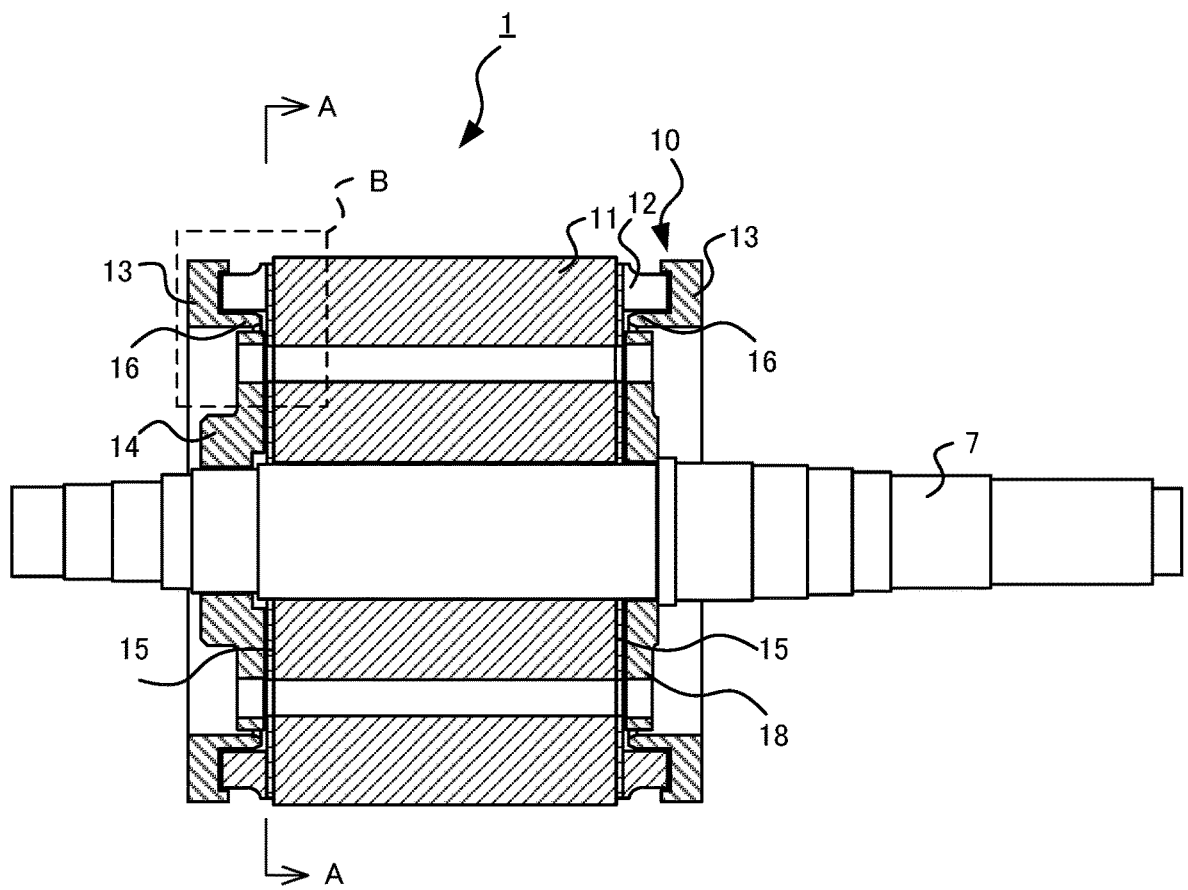
FIG. 1 is a cross-sectional view of a rotor according to Embodiment 1 of the present disclosure.
Figure 2:
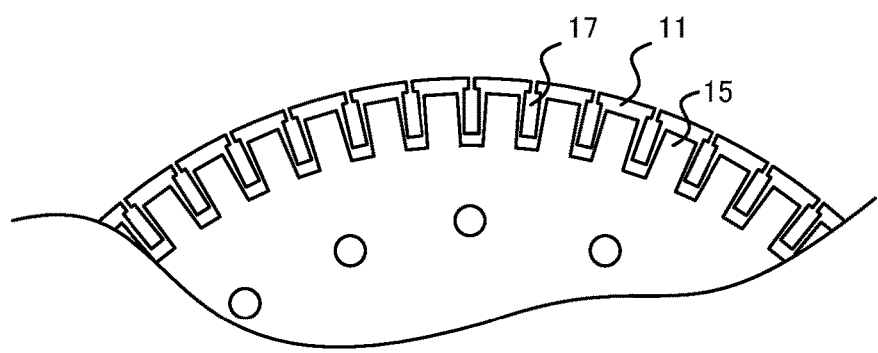
FIG. 2 is a cross-sectional view of the rotor according to Embodiment 1.
Figure 3:
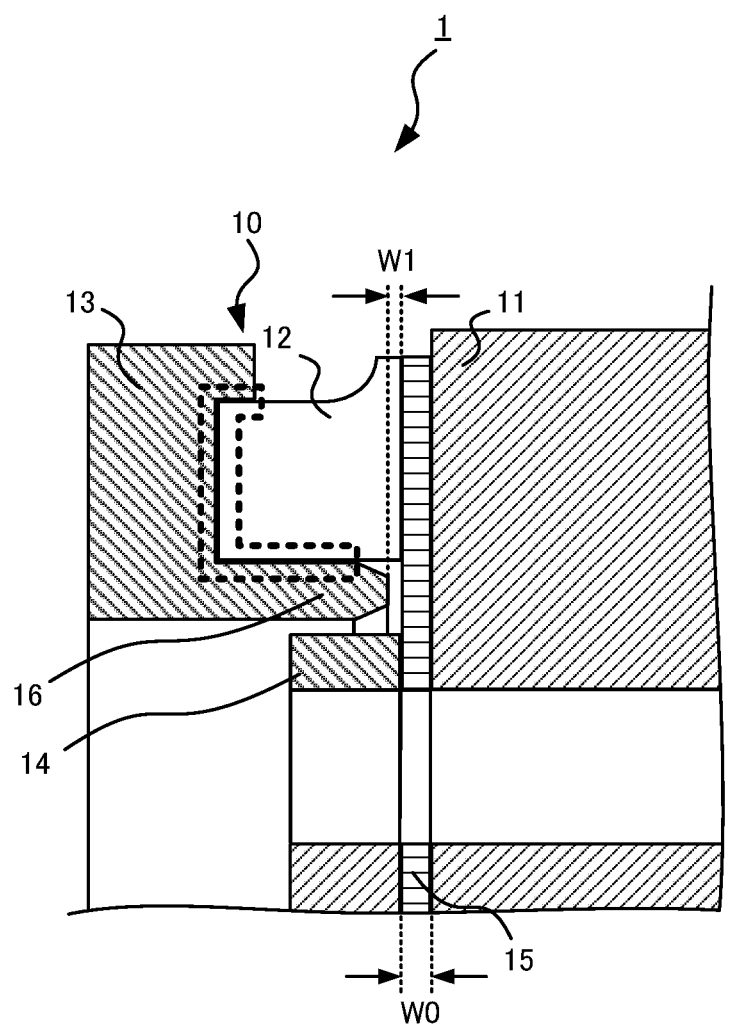
FIG. 3 is a partial cross-sectional view of the rotor according to Embodiment 1.
Figure 4:
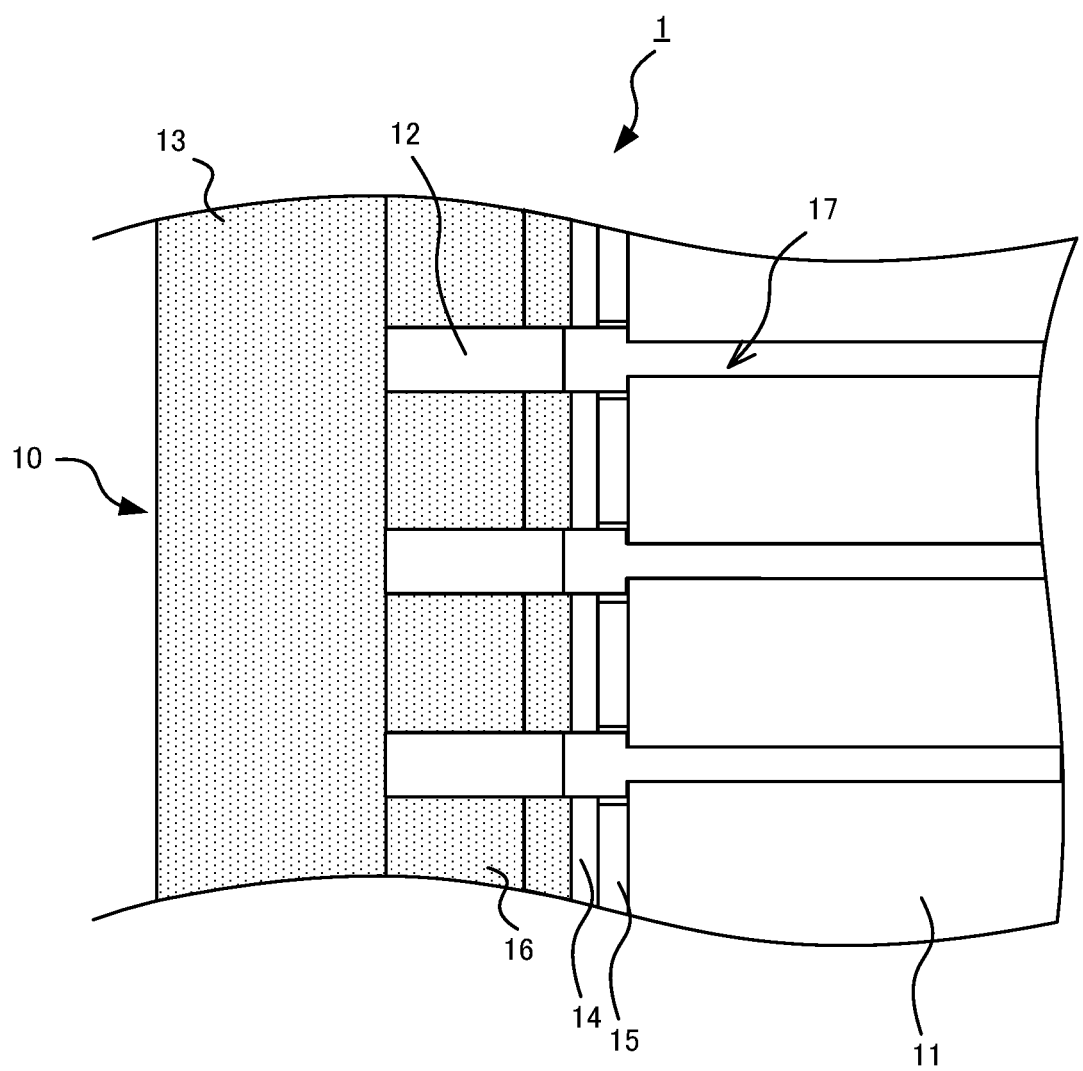
FIG. 4 is an external view of the rotor according to Embodiment 1 viewed in a radial direction.

FIG. 1 is a cross-sectional view of a rotor according to Embodiment 1 of the present disclosure. A squirrel cage induction motor for a vehicle includes a rotor 1, a rotating shaft 7, and a stator. The stator is fixed to a housing supporting the rotating shaft 7 in a rotatable manner via bearings, and faces the outer peripheral surface of the rotor 1 across a space. FIG. 1 is a cross-sectional view taken along a plane parallel to the rotating shaft 7. In FIG. 1, only the rotor 1 and the rotating shaft 7 are illustrated. FIG. 2 is a cross-sectional view of the rotor according to Embodiment 1. FIG. 2 is a cross-sectional view taken along line A-A in FIG. 1. FIG. 3 is a partial cross-sectional view of the rotor according to Embodiment 1. FIG. 3 is an enlarged view of an area B indicated by broken lines in FIG. 1. FIG. 4 is an external view of the rotor according to Embodiment 1 viewed in the radial direction.

The rotor 1 is fitted on the rotating shaft 7. The rotor 1 fitted on the rotating shaft 7 includes a rotor core 11 that is a cylinder coaxial with the rotating shaft 7, and a rotor conductor 10 retained by the rotor core 11. The rotor core 11 has, on the outer periphery of the cylinder, slots 17 extending parallel to the rotating shaft 7. The rotor conductor 10 includes rotor bars 12 and short-circuit rings 13. The rotor bars 12 are conductive and each slot 17 receives one of the rotor bars. Each rotor bar 12 has two ends in a direction parallel to the rotating shaft 7, protruding outwardly from the rotor core 11. The rotor 1 further has a pair of short-circuit rings 13 having the main surfaces facing each other in the direction along the rotating shaft 7 across the rotor bars 12. Each short-circuit ring 13 is a conductor bonded to the corresponding ends of the rotor bars 12 to electrically connect the rotor bars 12 together. Each short-circuit ring 13 has an annular cross section perpendicular to the rotating shaft 7. The rotor 1 further includes a pair of core retainers 14 and 18 located across the rotor core 11 in the direction along the rotating shaft 7. The core retainers 14 and 18 each have an annular cross section perpendicular to the rotating shaft 7. The core retainers 14 and 18 prevent the rotor core 11 that is a laminate of thin plates from deviating or moving in the direction along the rotating shaft 7.

In Embodiment 1, the pair of core retainers 14 and 18 are located across the rotor core 11 via end plates 15. Each end plate 15 prevents the rotor core 11 as a laminate of thin plates from being separated, or in other words, deviating in a direction parallel to the rotating shaft 7. Each end plate 15 has an annular cross section perpendicular to the rotating shaft 7 and has slots shaped in correspondence with the slots 17 on the outer periphery. The rotor 1 further includes deformation prevention portions 16 located between each short-circuit ring 13 and the rotor core 11. At least part of the deformation prevention portions 16 faces the outer peripheral surfaces of the core retainers 14 and 18. The deformation prevention portion 16 is fixed to the short-circuit ring 13 and at least partially to at least one rotor bar 12 and prevents bending deformation of at least a portion of the at least one fixed rotor bar 12 in a direction tangent to the outer peripheral surface of the rotor core 11.

In Embodiment 1, the deformation prevention portion 16 has an annular cross section perpendicular to the rotating shaft 7. The short-circuit ring 13 and the corresponding deformation prevention portion 16 are formed integral with each other. More specifically, the integral piece of the short-circuit ring 13 and the deformation prevention portion 16 has a substantially L-shaped cross section taken along the rotating shaft 7. The outer peripheral surface of each deformation prevention portion 16 is fixed to at least a portion of each of the rotor bars 12 including the ends. At least a portion of the inner peripheral surface of each deformation prevention portion 16 faces the outer peripheral surfaces of the core retainers 14 and 18. The short-circuit ring 13 and the corresponding deformation prevention portion 16 are formed integral with each other. Thus, the surface of each deformation prevention portion 16 facing the short-circuit ring 13 is integral with the corresponding short-circuit ring 13. In the example illustrated in FIG. 3, each rotor bar 12 and the corresponding short-circuit ring 13 are bonded together by silver brazing or welding in the area indicated by a broken line. A portion of the surface of each rotor bar 12 facing the rotating shaft 7 is bonded to the corresponding deformation prevention portion 16. In FIG. 4, the short-circuit ring 13 and the deformation prevention portion 16 are indicated as dotted areas. The deformation prevention portion 16 fixed to the short-circuit ring 13 and at least a portion of the rotor bar 12 including the end prevents bending deformation of the at least a portion of the fixed rotor bar 12 in the direction tangent to the outer peripheral surface of the rotor core 11.

Figure 5:
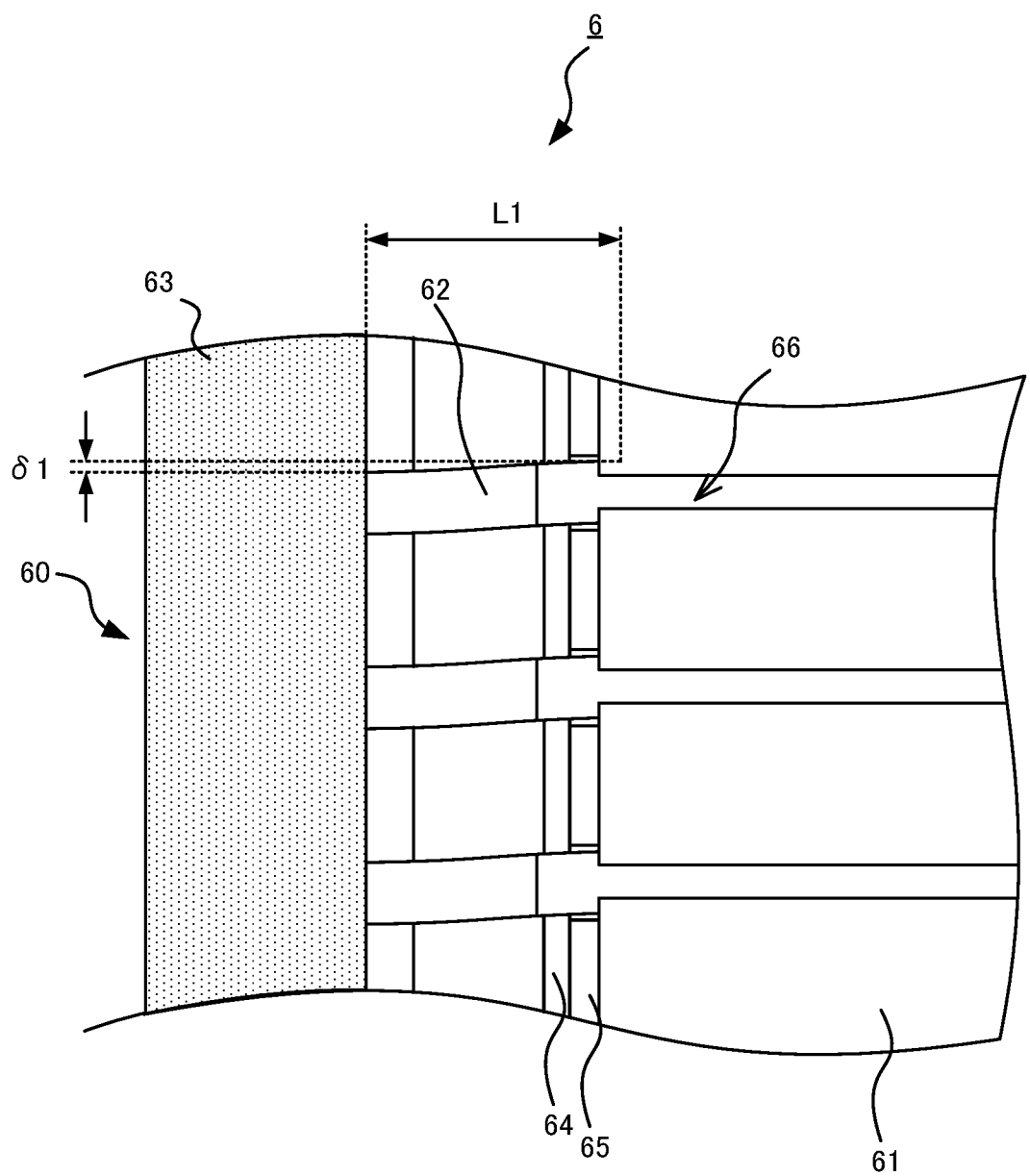
FIG. 5 is a diagram illustrating an example of deformation of a rotor bar.

FIG. 5 is a diagram illustrating an example of deformation of a rotor bar. A rotor 6 illustrated in FIG. 5 is fitted on a rotating shaft (not illustrated) in the same manner as the rotor 1 illustrated in FIG. 4. The rotor 6 includes a rotor core 61 that is a cylinder coaxial with the rotating shaft and a rotor conductor 60 retained by the rotor core 61. The rotor 6 is fitted on the rotating shaft, and rotates integrally with the rotating shaft. The rotor core 61, which is cylindrical, has slots 66 extending parallel to the rotating shaft on an outer periphery. The rotor conductor 60 includes rotor bars 62 and short-circuit rings 63. The rotor bars 62 are conductive and each slot 66 receives one of the rotor bars 62. Each rotor bar 62 has two ends in a direction parallel to the rotating shaft protruding outwardly from the rotor core 61. The rotor 6 further includes a pair of short-circuit rings 63 having the main surfaces facing each other in a direction parallel to the rotating shaft across the rotor bars 62. Each short-circuit ring 63 has an annular cross section perpendicular to the rotating shaft. The rotor 6 further includes a core retainer 64 having an annular cross section perpendicular to the rotating shaft. The rotor 6 includes another core retainer (not illustrated) located opposite to the core retainer 64 across the rotor core 61. This core retainer and the core retainer 64 are located across the rotor core 61 via end plates 65 in the direction along the rotating shaft.

Unlike the deformation prevention portions 16 included in the rotor 1, the rotor 6 has no members fixed to the short-circuit ring 63 and fixed to at least a portion of the rotor bar 62. When the short-circuit ring 63 is twisted against the rotor core 61 in a rotational direction about the rotating shaft, a portion of the rotor bar 62 bends and deforms in the direction tangent to the outer peripheral surface of the rotor core 61 in accordance with torsion of the short-circuit ring 63. In the example illustrated in FIG. 5, a portion of the rotor bar 62 deforms with a length L1 from a bond position between the rotor bar 62 and the short-circuit ring 63 to a position inside the slot 66 receiving the rotor bar 62 on the outer periphery of the rotor core 61. The rotor bar 62 is received in the slot 66. Thus, when the rotor bar 62 bends, the deformed portion of the rotor bar 62 having the length L1 shows no inclination at two ends and has the ends fixed and retained. The end of the rotor bar 62 has a displacement δ1 due to bending deformation of the rotor bar 62 in the direction tangent to the outer peripheral surface of the rotor core 11. An end of the deformed portion of the rotor bar 62 having the length L1 is received in the slot 66 at a position determined by, for example, variations in the thin plates for the rotor core 61 and a clearance between the slot 66 and the rotor bar 62.

A force F in the direction tangent to the outer peripheral surface of the rotor core 11 to displace an end of one rotor bar 62 by the displacement δ1 in the direction tangent to the outer peripheral surface of the rotor core 11 is expressed by Formula 1 below, where I is the sectional secondary moment for the deformation of the rotor bar 62 and E is the longitudinal elastic modulus.

Formula 1

$$F = \frac{\delta 1 \cdot 12 \cdot E \cdot I}{L1^3} \quad (1)$$

A torque T required for twisting the short-circuit ring 63 to displace each end of the rotor bar 62 by the displacement δ1 in the direction tangent to the outer peripheral surface of the rotor core 11 is expressed by Formula 2 below, where Z is the number of rotor bars 62 and R is the distance between the centers of each rotor bar 62 and the rotating shaft.

Formula 2

$$T = F \cdot Z \cdot R \quad (2)$$

A torsional angle φ of the short-circuit ring 63 when an end of the rotor bar 62 is displaced by the displacement δ1 in the direction tangent to the outer peripheral surface of the rotor core 11 is expressed by Formula 3 below.

Formula 3

$$\phi = \frac{\delta 1}{R} \quad (3)$$

A torsional rigidity K of the short-circuit ring 63 with respect to the rotor core 61 when an end of the rotor bar 62 is displaced by the displacement δ1 in the direction tangent to the outer peripheral surface of the rotor core 11 is expressed by Formula 4 below.

Formula 4

$$K = \frac{T}{\phi} \quad (4)$$
$$= \frac{F \cdot Z \cdot R \cdot R}{\delta 1}$$
$$= \frac{12 \cdot E \cdot I \cdot Z \cdot R^2}{L1^3}$$

A torsional natural frequency f0 of the rotor conductor 60 when the short-circuit ring 63 undergoes torsional vibration relative to the rotor core 61 is expressed by Formula 5 below, where J is the inertial moment of the short-circuit ring 63 in the rotational direction about the rotating shaft.

Formula 5

$$f0 = \frac{1}{2\pi} \cdot \sqrt{\frac{K}{J}} \quad (5)$$
$$= \frac{1}{2\pi} \cdot \sqrt{\frac{12 \cdot E \cdot I \cdot Z \cdot R^2}{J \cdot L1^3}}$$

To increase the torsional natural frequency of the rotor conductor 60 without changing the material and dimensions of each rotor bar 62 and the number of rotor bars 62 and the outer diameter of the rotor core 61, the inertial moment J in Formula 5 above and the length L1 of the deformed portion of the rotor bar 62 ought to be reduced. The inertial moment J may be reduced by reducing the cross-sectional area of the short-circuit ring 63 parallel to the rotating shaft. However, reducing the cross-sectional area of the short-circuit ring 63 increases current density, and thus causes the temperature of the short-circuit ring 63 to increase.

Figure 6:
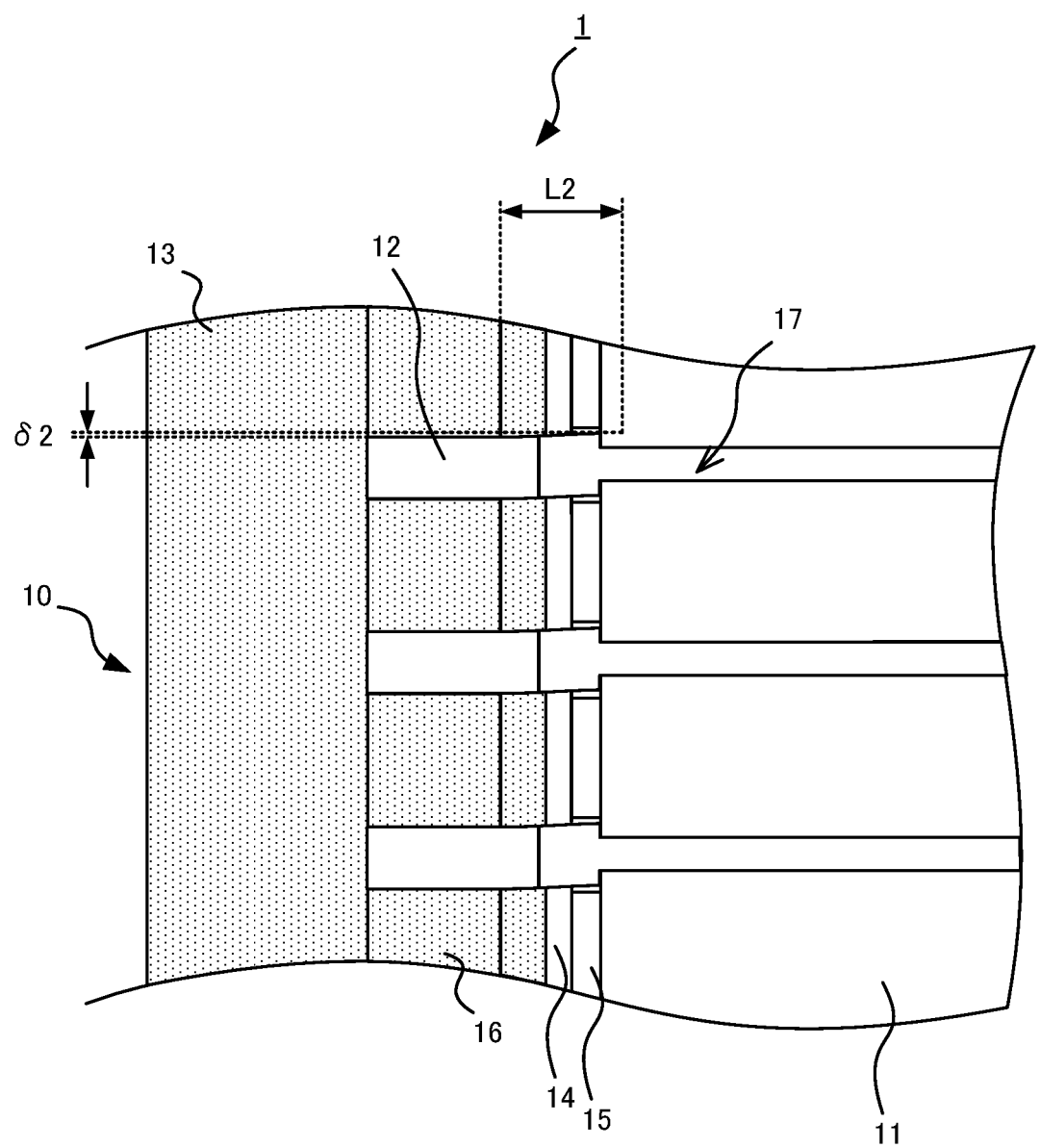
FIG. 6 is a diagram illustrating an example of deformation of a rotor bar in Embodiment 1.

In Embodiment 1, the deformed portion of the rotor bar 12 is shortened to increase the torsional natural frequency of the rotor conductor 10. FIG. 6 is a diagram illustrating an example of deformation of a rotor bar in Embodiment 1. In the same manner as in the example of FIG. 5, when the short-circuit ring 13 is twisted against the rotor core 11 in a rotational direction about the rotating shaft 7, a portion of the rotor bar 12 bends and deforms in accordance with torsion of the short-circuit ring 13. In the example illustrated in FIG. 6, a portion of the rotor bar 12 deforms for a length L2 to a position inside the slot 17 from an end of the portion near the rotor core 11 along which the rotor bar 12 and the deformation prevention portion 16 are bonded together. The inclusion of the deformation prevention portion 16 prevents the portion of the rotor bar 12 bonded to the deformation prevention portion 16 from deforming. In the example illustrated in FIG. 6, the end of the rotor bar 12 has a displacement δ2 in the direction tangent to the outer peripheral surface of the rotor core 11. The length L2 is smaller than the length L1. The displacement δ2 is smaller than the displacement δ1. In other words, the inclusion of the deformation prevention portion 16 partially reduces the bending deformation of the rotor bar 12. However, the short-circuit ring 13 partially protrudes toward the rotor core 11 to form the deformation prevention portion 16. This increases the inertial moment J. When the inertial moment J in the example of FIG. 6 is, for example, 1.2 times the inertial moment J in the example of FIG. 5 and the length L2 of the deformed portion of the rotor bar 12 is, for example, 0.6 times the length L1, the torsional natural frequency f1 of the rotor conductor 10 is expressed by Formula 6 below.

Formula 6

$$f1 = \frac{1}{2\pi} \cdot \sqrt{\frac{12 \cdot E \cdot I \cdot Z \cdot R^2}{1.2 \cdot J \cdot (0.6 \cdot L1)^3}} \quad (6)$$
$$= 1.96 \cdot f0$$

In the above example, the torsional natural frequency f1 of the rotor conductor 10 in the rotor 1 according to Embodiment 1 may be twice the torsional natural frequency f0 of the rotor conductor 60 in the rotor 6 without the deformation prevention portion 16. The inclusion of the deformation prevention portion 16 may shorten the deformed portion of the rotor bar 12 and increase the torsional natural frequency of the rotor conductor 10. This prevents the rotor conductor 10 in the rotor 1 from resonating, and thus reduces the likelihood of the rotor conductor 10 being subjected excess stress.

The rotor bar 62 is received in the slot 66 on the outer periphery of the rotor core 61 and then fixed by a type of crimping operation called swaging. Tension is applied from the rotor bar 62 to the two facing surfaces of the slot 66. This reduces the likelihood of the rotor bar 62 moving in the direction along the rotating shaft inside the slot 66 during use of the squirrel cage induction motor for a vehicle including the rotor 6. The rotor bar 62 may expand or contract due to temperature changes during use of the squirrel cage induction motor for a vehicle, thus reducing tension. When the tension is reduced, the rotor bar 62 with the short-circuit ring 63 bonded at two ends is displaced relative to the rotor core 61 in the direction along the rotating shaft. The displacement of the rotor bar 62 changes an entire balance of the rotor 6, thus increasing vibration. In response to this, in the rotor 1 according to Embodiment 1 as illustrated in FIG. 3, an interval W1 between the deformation prevention portion 16 and the end plate 15 is half or less than half a thickness W0 of the end plate 15 in the direction along the rotating shaft 7. This may reduce the displacement of the rotor bar 12 relative to the rotor core 11 in the direction along the rotating shaft 7 to half or less than half the thickness of the end plate 15 in the direction along the rotating shaft 7. This reduces an increase of vibration that is due to the displacement of the rotor bar 12.

The rotor bars 12 are circumferentially located at intervals on the rotor core 11. When the rotor 1 rotates, the air inward from the rotor bars 12 is discharged outward. In other words, the rotor 1 serves as a fan. The stator facing the outer peripheral surface of the rotor 1 includes a stator core, and a stator coil protruding outwardly from the stator core in a direction parallel to the rotating shaft 7. When the air discharged outward from inside the rotor bars 12 collides with the stator coil, noise is generated. Frequency of this noise is a value obtained by multiplying rotational frequency of the rotor 1 by the number of rotor bars 12. The frequency of the noise varies in accordance with rotation speed of the rotor 1. When the resonance frequency in a space inside the housing for the squirrel cage induction motor for a vehicle matches the frequency of the noise, the noise turns into pure tone and increases greatly. The interval W1 between the deformation prevention portion 16 and the end plate 15 is reduced to half or less than half the thickness W0 of the end plate 15 in the direction along the rotating shaft 7 as described above to reduce the flow rate of air discharged outward from inside the rotor bars 12, thus suppressing the noise from increasing.

As described above, the squirrel cage induction motor for a vehicle according to Embodiment 1 of the present disclosure includes the deformation prevention portions 16 in the rotor 1 thereby reducing the likelihood of the rotor bar 12 being subjected to excess stress. Further, the interval W1 between each deformation prevention portion 16 and the end plate 15 is reduced to half or less than half the thickness W0 of the end plate 15 in the direction along the rotating shaft 7 thereby reducing the likelihood of displacement of the rotor bar 12 increasing vibration and noise.

Embodiment 2

Figure 7:
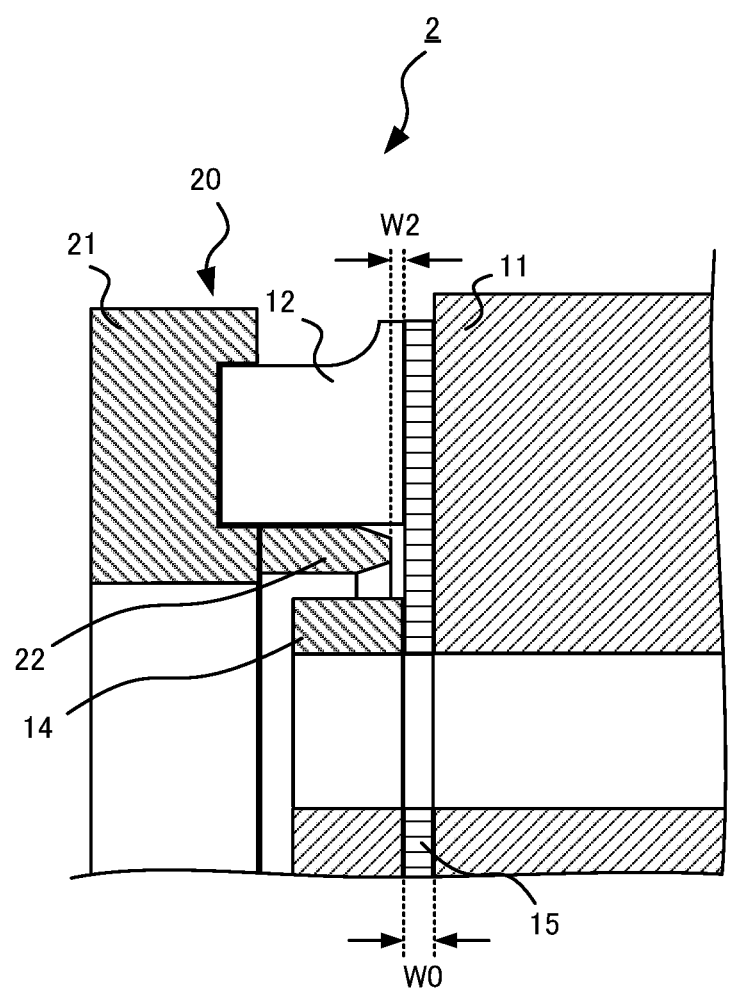
FIG. 7 is a partial cross-sectional view of a rotor according to Embodiment 2 of the present disclosure.
Figure 8:
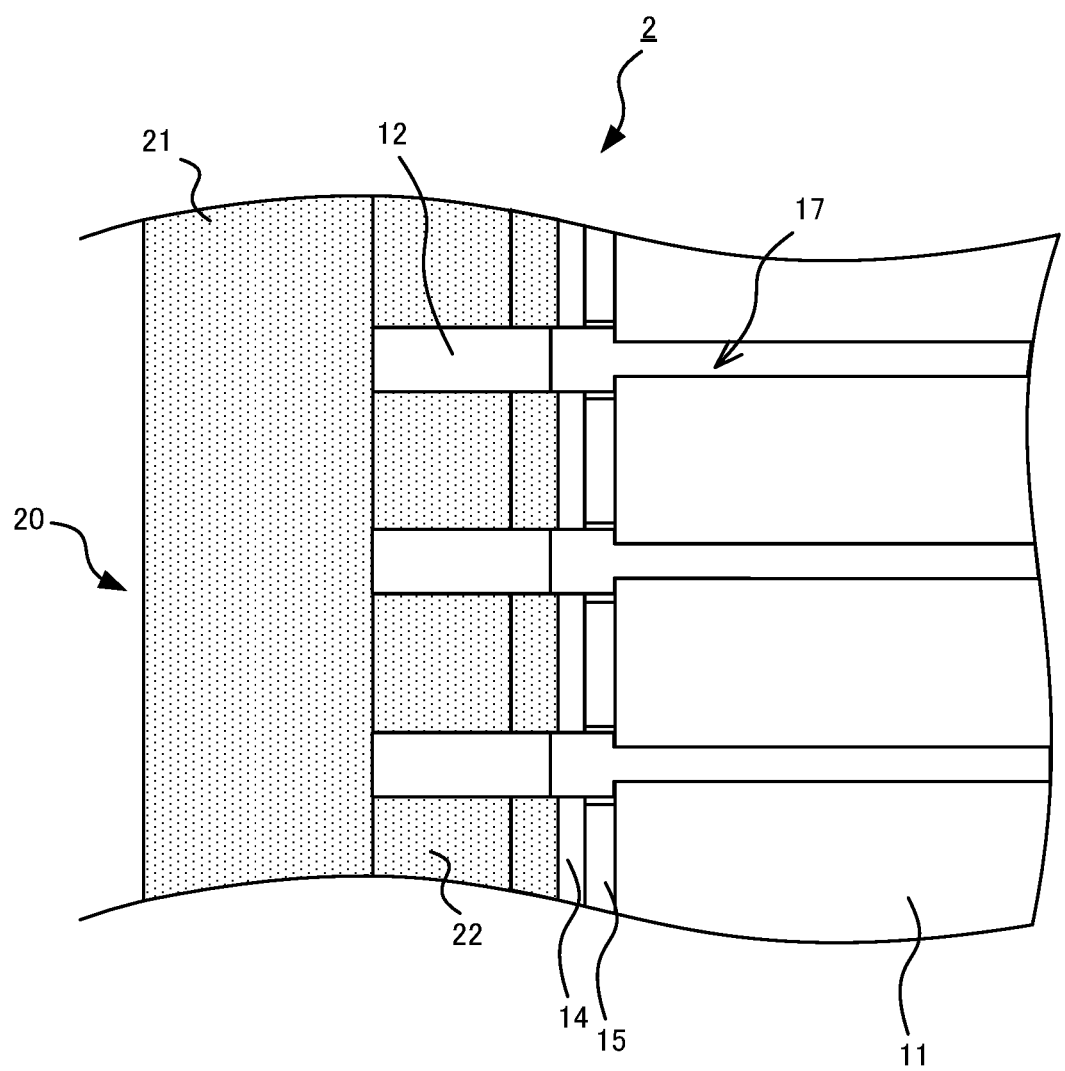
FIG. 8 is an external view of the rotor according to Embodiment 2 viewed in the radial direction.

FIG. 7 is a partial cross-sectional view of a rotor according to Embodiment 2 of the present disclosure. FIG. 7 is a partially enlarged view of a rotor 2 according to Embodiment 2 in the same manner as in FIG. 3. FIG. 8 is an external view of the rotor according to Embodiment 2 viewed in the radial direction. A rotor conductor 20 in the rotor 2 according to Embodiment 2 includes short-circuit rings 21 and deformation prevention portions 22 in place of the short-circuit ring 13 included in the rotor conductor 10 in the rotor 1 according to Embodiment 1. The short-circuit rings 21 and the deformation prevention portions 22 are separate members. A pair of the short-circuit rings 21 have the main surfaces facing each other in a direction parallel to the rotating shaft 7 across the rotor bars 12, in the same manner as in Embodiment 1. Each short-circuit ring 21 is a conductor bonded to the corresponding ends of the rotor bars 12 to electrically connect the rotor bars 12 together. Each short-circuit ring 21 has an annular cross section perpendicular to the rotating shaft 7.

Each deformation prevention portion 22 has an annular cross section perpendicular to the rotating shaft 7. The outer peripheral surface of each deformation prevention portion 22 is fixed to at least a portion of each of the rotor bars 12 including the ends. At least a portion of the inner peripheral surface of each deformation prevention portion 22 faces the outer peripheral surfaces of the core retainers 14 and 18. The surface of each deformation prevention portion 22 facing the short-circuit ring 21 is bonded to the short-circuit ring 21 by silver brazing or welding. In the example illustrated in FIG. 7, each rotor bar 12 and the corresponding short-circuit ring 21 are bonded together by silver brazing or welding. The outer peripheral surface of each deformation prevention portion 22 is bonded to a portion of the surface of the corresponding rotor bar 12 continuous from the end of the rotor bar 12 and facing the rotating shaft 7. The separated short-circuit ring 21 and the deformation prevention portion 22 achieve manufacturing cost reduction.

The rotor bar 12 in the rotor 2 according to Embodiment 2 undergoes bending deformation in the same manner as in FIG. 6. Similarly to the example in FIG. 6, when the short-circuit ring 21 is twisted against the rotor core 11 in the rotational direction about the rotating shaft 7, a portion of the rotor bar 12 bends and deforms in the direction tangent to the outer peripheral surface of the rotor core 11 in accordance with the torsion of the short-circuit ring 21. The inclusion of the deformation prevention portion 22 prevents the portion of the rotor bar 12 bonded to the deformation prevention portion 22 from deforming. The inclusion of the deformation prevention portion 22 may shorten the deformed portion of the rotor bar 12 and increase the torsional natural frequency of the rotor conductor 20. This prevents the rotor conductor 20 in the rotor 2 from resonating, and thus reduces the likelihood of the rotor conductor 20 being subjected to excess stress.

An interval W2 between the deformation prevention portion 22 and the end plate 15 is half or less than half the thickness W0 of the end plate 15 in the direction along the rotating shaft 7, in the same manner as in Embodiment 1. This may reduce the displacement of the rotor bar 12 relative to the rotor core 11 in the direction along the rotating shaft 7 to half or less than half the thickness of the end plate 15 in the direction along the rotating shaft 7. This reduces the likelihood of displacement of the rotor bar 12 increasing the vibration. The interval W2 between the deformation prevention portion 22 and the end plate 15 is reduced to half or less than half the thickness W0 of the end plate 15 in the direction along the rotating shaft 7 thereby reducing the flow rate of air discharged outward from inside the rotor bar 12, thus suppressing the noise from increasing.

As described above, the squirrel cage induction motor for a vehicle according to Embodiment 2 of the present disclosure includes the deformation prevention portions 22 in the rotor 2 thereby reducing the likelihood of the rotor bar 12 being subjected to excess stress. The separated short-circuit ring 21 and the deformation prevention portion 22 further achieve manufacturing cost reduction. The interval W2 between each deformation prevention portion 22 and the end plate 15 is reduced to half or less than half the thickness W0 of the end plate 15 in the direction along the rotating shaft 7 to reduce the likelihood of displacement of the rotor bar 12 increasing vibration and noise.

Embodiment 3

Figure 9:
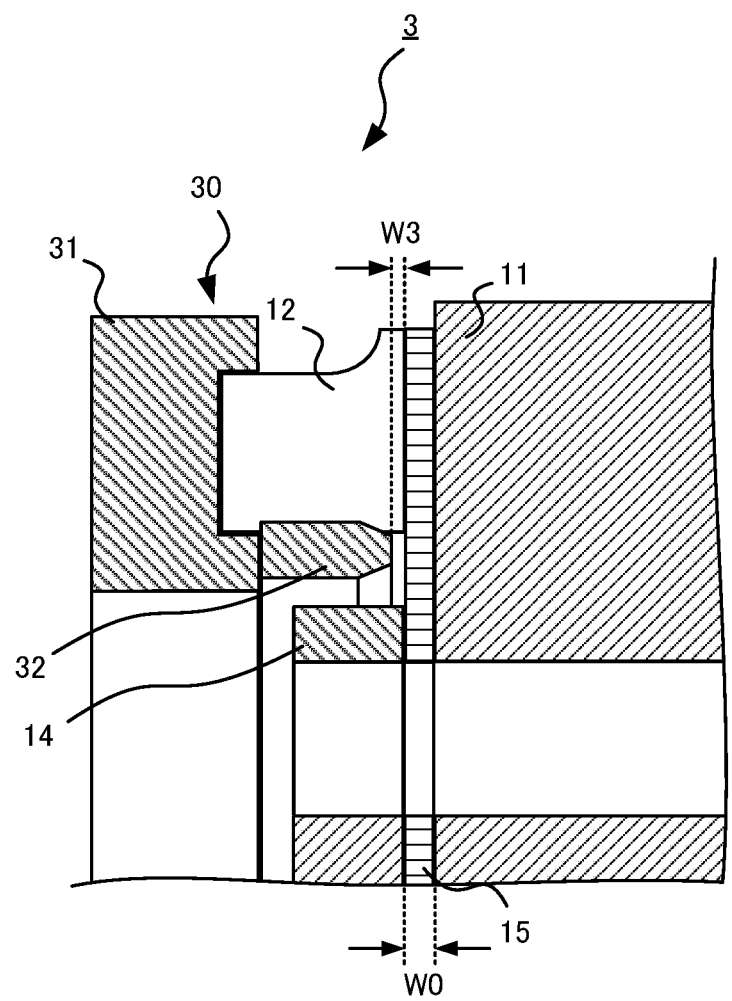
FIG. 9 is a partial cross-sectional view of a rotor according to Embodiment 3 of the present disclosure.
Figure 10:
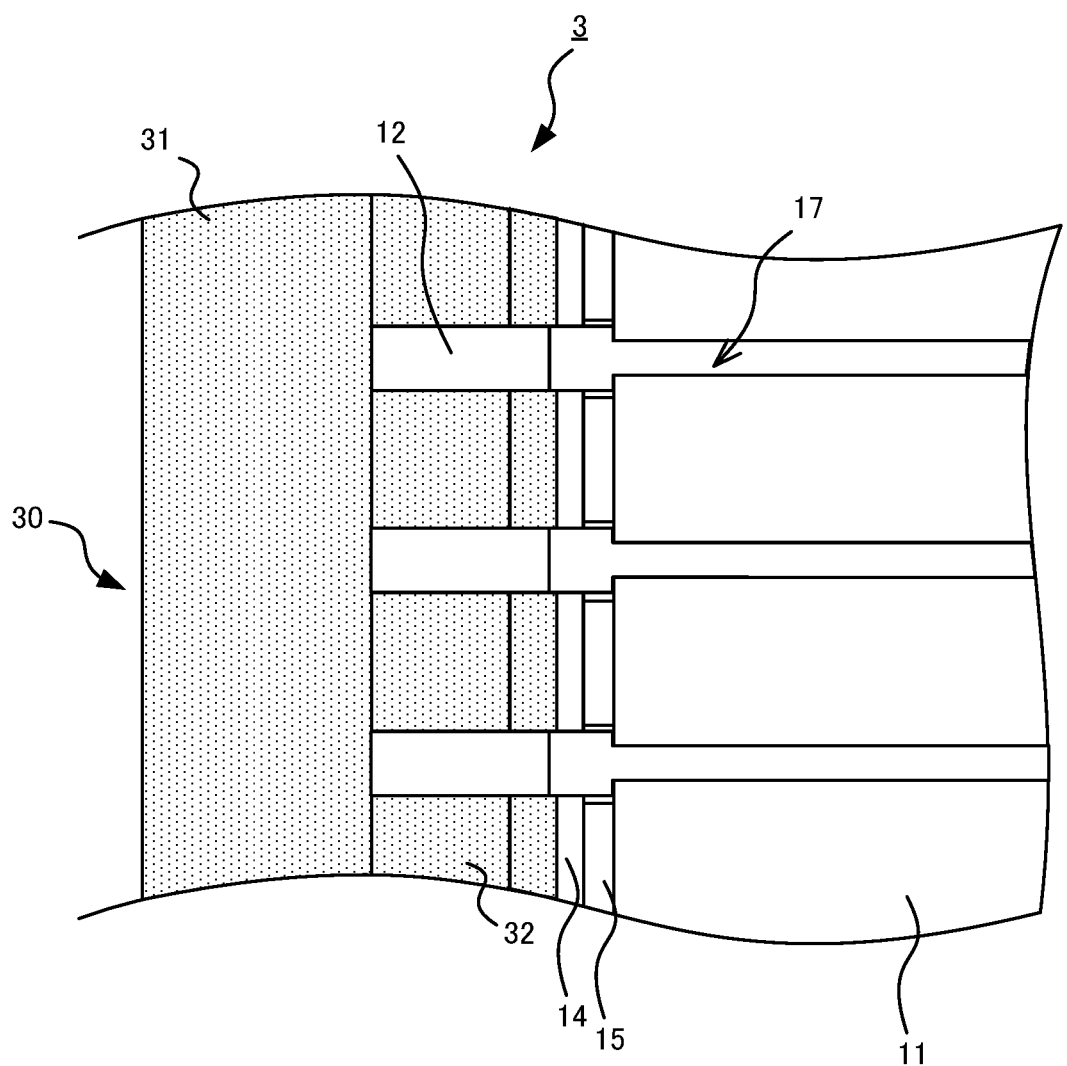
FIG. 10 is an external view of the rotor according to Embodiment 3 viewed in the radial direction.
Figure 11:
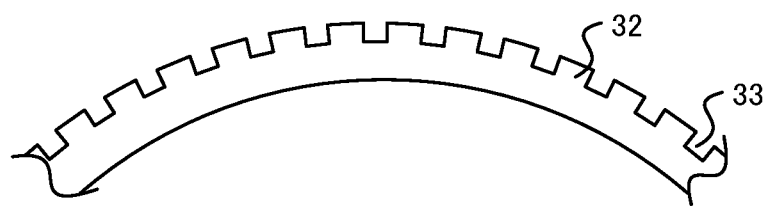
FIG. 11 is a diagram illustrating a deformation prevention portion according to Embodiment 3.

FIG. 9 is a partial cross-sectional view of a rotor according to Embodiment 3 of the present disclosure. FIG. 9 is a partially enlarged view of a rotor 3 according to Embodiment 3, in the same manner as in FIG. 3. A rotor conductor 30 in the rotor 3 according to Embodiment 3 includes short-circuit rings 31 and deformation prevention portions 32 in place of the short-circuit ring 13 included in the rotor conductor 10 in the rotor 1 according to Embodiment 1. Each short-circuit ring 31 is shaped similarly to the short-circuit ring 21 included in the rotor conductor 20 in the rotor 2 according to Embodiment 2. FIG. 10 is an external view of the rotor according to Embodiment 3 viewed in the radial direction. FIG. 11 is a diagram illustrating a deformation prevention portion according to Embodiment 3.

Each deformation prevention portion 32 has an annular cross section perpendicular to the rotating shaft 7. The deformation prevention portion 32 has slots 33 corresponding one-to-one to the rotor bars 12 on the outer peripheral surface. The slot 33 receives at least a portion of the rotor bar 12 including ends of the rotor bar 12. Thus, the deformation prevention portion 32 is fixed to at least a portion of the rotor bar 12. At least a portion of the inner peripheral surface of each deformation prevention portion 32 faces the outer peripheral surfaces of the core retainers 14 and 18. The surface of each deformation prevention portion 32 facing the short-circuit ring 31 is bonded to the short-circuit ring 31 by silver brazing or welding.

The rotor bar 12 in the rotor 3 according to Embodiment 3 undergoes bending deformation in the direction tangent to the outer peripheral surface of the rotor core 11 in the same manner as in FIG. 6. In the same manner as in the example of FIG. 6, when the short-circuit ring 31 is twisted against the rotor core 11 in the rotational direction about the rotating shaft 7, a portion of the rotor bar 12 bends and deforms in accordance with the torsion of the short-circuit ring 31. The inclusion of the deformation prevention portion 32 prevents the portion of the rotor bar 12 fitted in the slot 33 on the deformation prevention portion 32 from deforming. The inclusion of the deformation prevention portion 32 may shorten the deformed portion of the rotor bar 12 and increase the torsional natural frequency of the rotor conductor 30. This prevents the rotor conductor 30 in the rotor 3 from resonating, and thus reduces the likelihood of the rotor conductor 30 being subjected to excess stress. The rotor bar 12 and the deformation prevention portion 32 may be bonded together by silver brazing or welding with the rotor bar 12 fitted in the slot 33.

An interval W3 between the deformation prevention portion 32 and the end plate 15 is half or less than half the thickness W0 of the end plate 15 in the direction along the rotating shaft 7, in the same manner as in Embodiment 1. This may reduce the displacement of the rotor bar 12 relative to the rotor core 11 in the direction along the rotating shaft 7 to half or less than half the thickness W0 of the end plate 15 in the direction along the rotating shaft 7. This reduces the likelihood of displacement of the rotor bar 12 increasing the vibration. The interval W3 between the deformation prevention portion 32 and the end plate 15 is reduced to half or less than half the thickness W0 of the end plate 15 in the direction along the rotating shaft 7 thereby reducing the flow rate of air discharged outward from inside the rotor bars 12, thus suppressing the noise from increasing.

As described above, the squirrel cage induction motor for a vehicle according to Embodiment 3 of the present disclosure includes the deformation prevention portions 32 in the rotor 3 thereby reducing the likelihood of the rotor bar 12 being subjected to excess stress. The interval W3 between each deformation prevention portion 32 and the end plate 15 is reduced to half or less than half the thickness W0 of the end plate 15 in the direction along the rotating shaft 7 to reduce the likelihood of displacement of the rotor bar 12 increasing vibration and noise.

Embodiment 4

Figure 12:
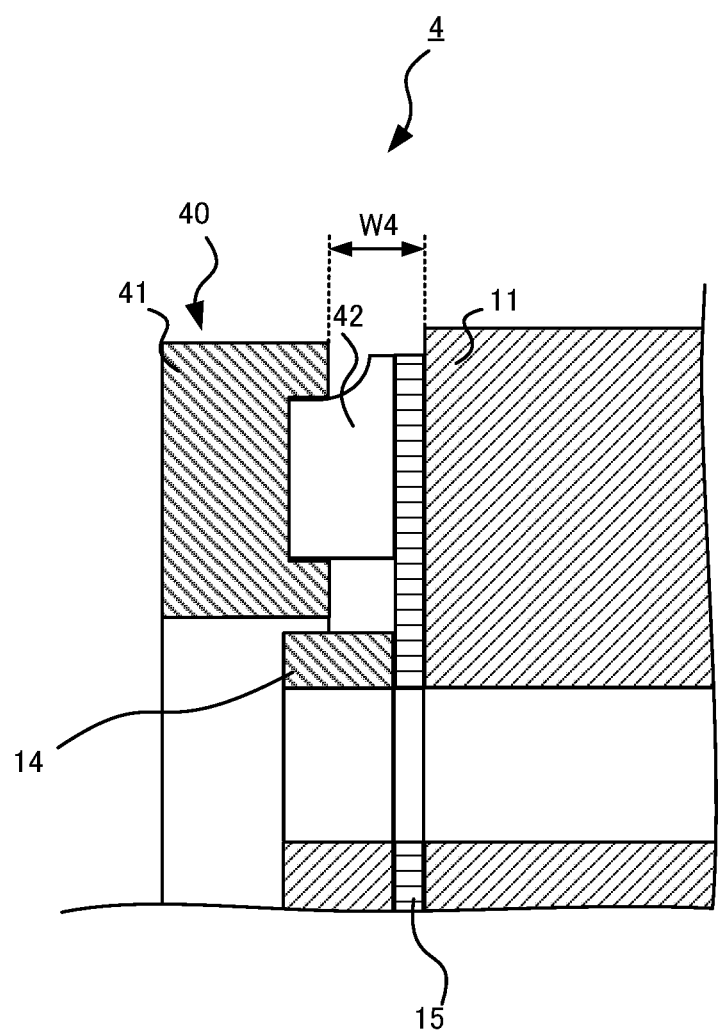
FIG. 12 is a partial cross-sectional view of a rotor according to Embodiment 4 of the present disclosure.
Figure 13:
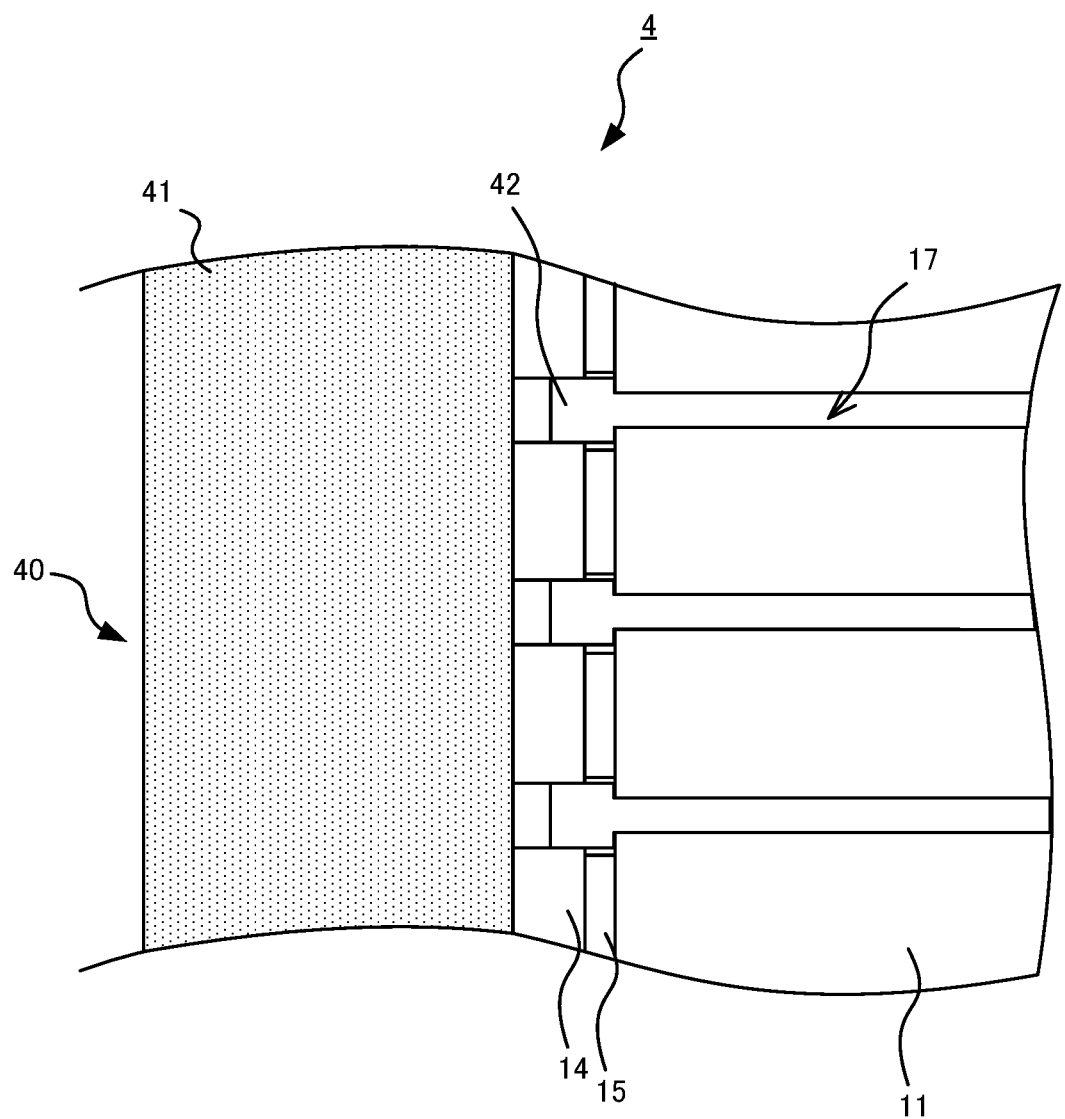
FIG. 13 is an external view of the rotor according to Embodiment 4 viewed in the radial direction.

FIG. 12 is a partial cross-sectional view of a rotor according to Embodiment 4 of the present disclosure. FIG. 12 is a partially enlarged view of a rotor 4 according to Embodiment 4, in the same manner as in FIG. 3. FIG. 13 is an external view of the rotor according to Embodiment 4 viewed in the radial direction. In the rotor 4 according to Embodiment 4, the length of the protruding ends of the rotor bar 42 from the rotor core 11 is shorter than the length of the protruding ends of the rotor bar 12 from the rotor core 11 according to Embodiment 1. A rotor conductor 40 included in the rotor 4 according to Embodiment 4 includes short-circuit rings 41, in place of the short-circuit ring 13 included in the rotor conductor 10 in the rotor 1 according to Embodiment 1. A pair of the short-circuit rings 41 have the main surfaces facing each other in a direction parallel to the rotating shaft 7 across the rotor bars 42. Each short-circuit ring 41 is a conductor bonded to the corresponding ends of the rotor bars 42 to electrically connect the rotor bars 42 together. The short-circuit ring 41 has a cross section along the rotating shaft 7 with a recess in a direction from the middle toward the end of the rotating shaft 7. Each rotor bar 42 is bonded in a corresponding recess in the short-circuit ring 41 by silver brazing or welding. At least a portion of the inner peripheral surface of the short-circuit ring 41 faces the outer peripheral surfaces of the core retainers 14 and 18. An interval W4 between the short-circuit ring 41 and the rotor core 11 is a value within a range defined in accordance with a gap for bonding the rotor bar 42 to the short-circuit ring 41 as described above. For example, the interval between the short-circuit ring 41 and the rotor core 11 may be minimized to allow an operation for bonding to be performed between the short-circuit ring 41 and the rotor bar 42.

Figure 14:
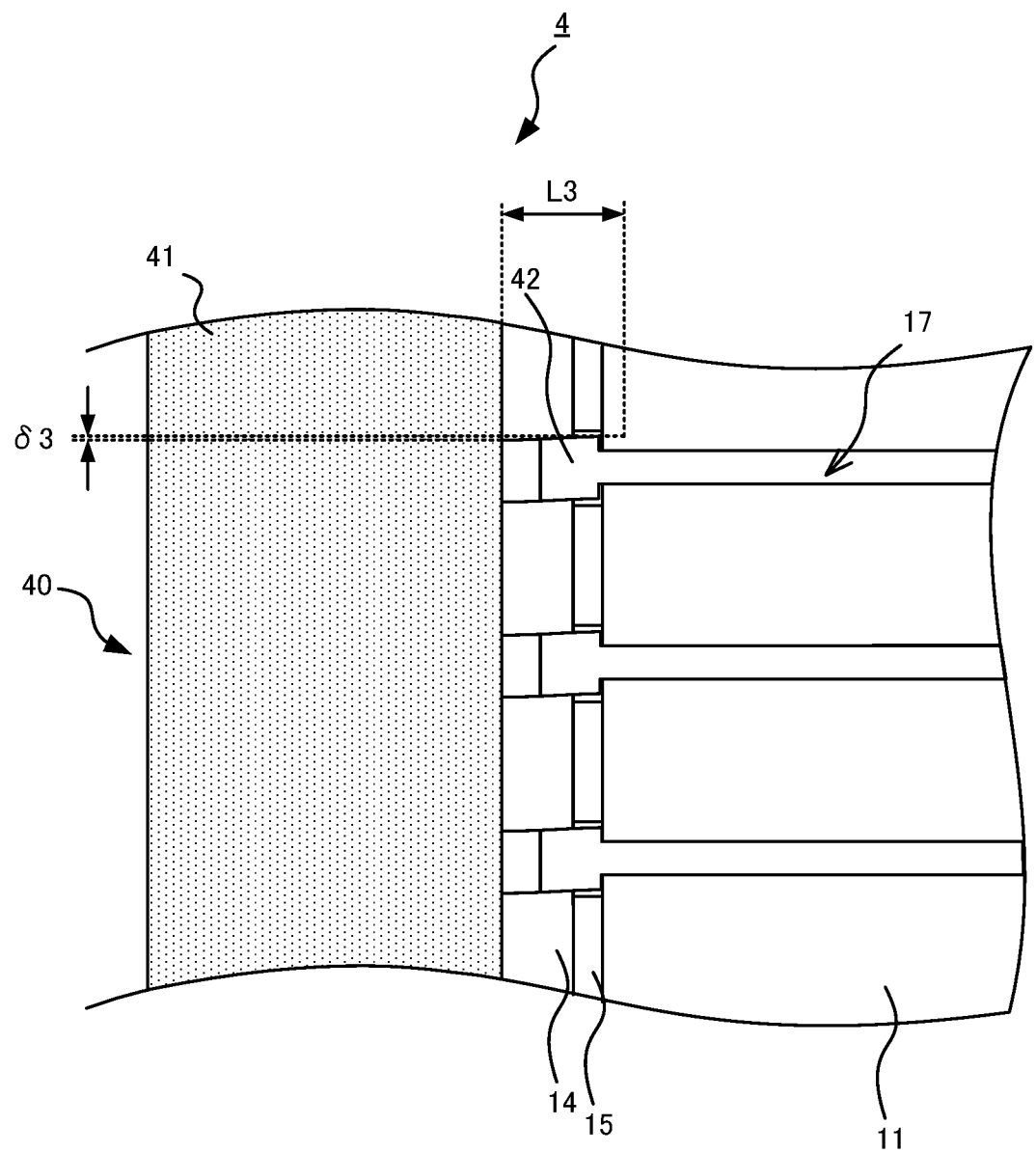
FIG. 14 is a diagram illustrating an example of deformation of a rotor bar in Embodiment 4.

FIG. 14 is a diagram illustrating an example of deformation of a rotor bar in Embodiment 4. When the short-circuit ring 41 is twisted against the rotor core 11 in the rotational direction about the rotating shaft 7, the rotor bar 42 partially bends and deforms in the direction tangent to the outer peripheral surface of the rotor core 11 in accordance with the torsion of the short-circuit ring 41. In the example illustrated in FIG. 14, a portion of the rotor bar 42 deforms for a length L3 to a position inside the slot 17 from an end of the portion near the rotor core 11 along which the rotor bar 42 and the short-circuit ring 41 are bonded together. The portion of the rotor bar 42 bonded to the short-circuit ring 41 does not deform. In the example illustrated in FIG. 14, the end of the rotor bar 42 has a displacement δ3 in the direction tangent to the outer peripheral surface of the rotor core 11. The length L3 is smaller than the length L1. The displacement δ3 is smaller than the displacement δ1. More specifically, the interval W4 between the short-circuit ring 41 and the rotor core 11 having a value within a range defined in accordance with a gap for bonding the rotor bar 42 to the short-circuit ring 41 reduces bending deformation of the rotor bar 42. Minimizing the above range of values to the smallest can shorten the deformed portion of the rotor bar 42 and increase the torsional natural frequency of the rotor conductor 40. This prevents the rotor conductor 40 in the rotor 4 from resonating, and thus reduces the likelihood of the rotor conductor 40 being subjected to excess stress.

As described above, in the squirrel cage induction motor for a vehicle according to Embodiment 4 of the present disclosure, setting the interval W4 between the short-circuit ring 41 of the rotor 4 and the rotor core 11 as a value that is within a range defined in accordance with a gap for bonding the rotor bar 42 to the short-circuit ring 41 reduces the likelihood of the rotor bar 42 being subjected to excess stress.

Embodiment 5

Figure 15:
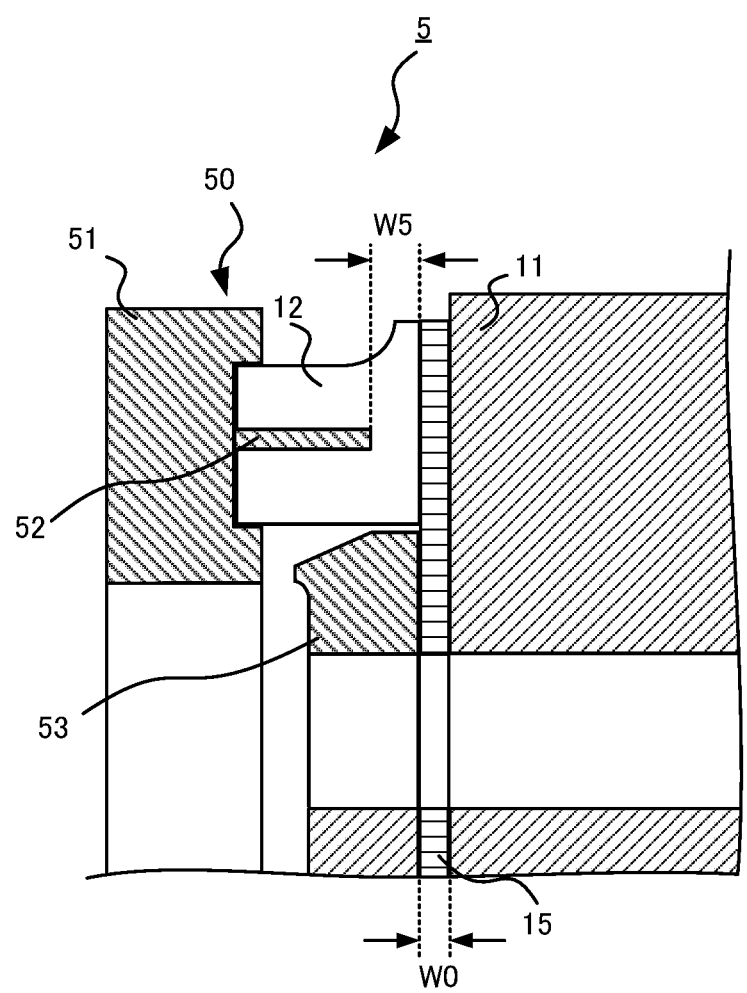
FIG. 15 is a partial cross-sectional view of a rotor according to Embodiment 5 of the present disclosure.
Figure 16:
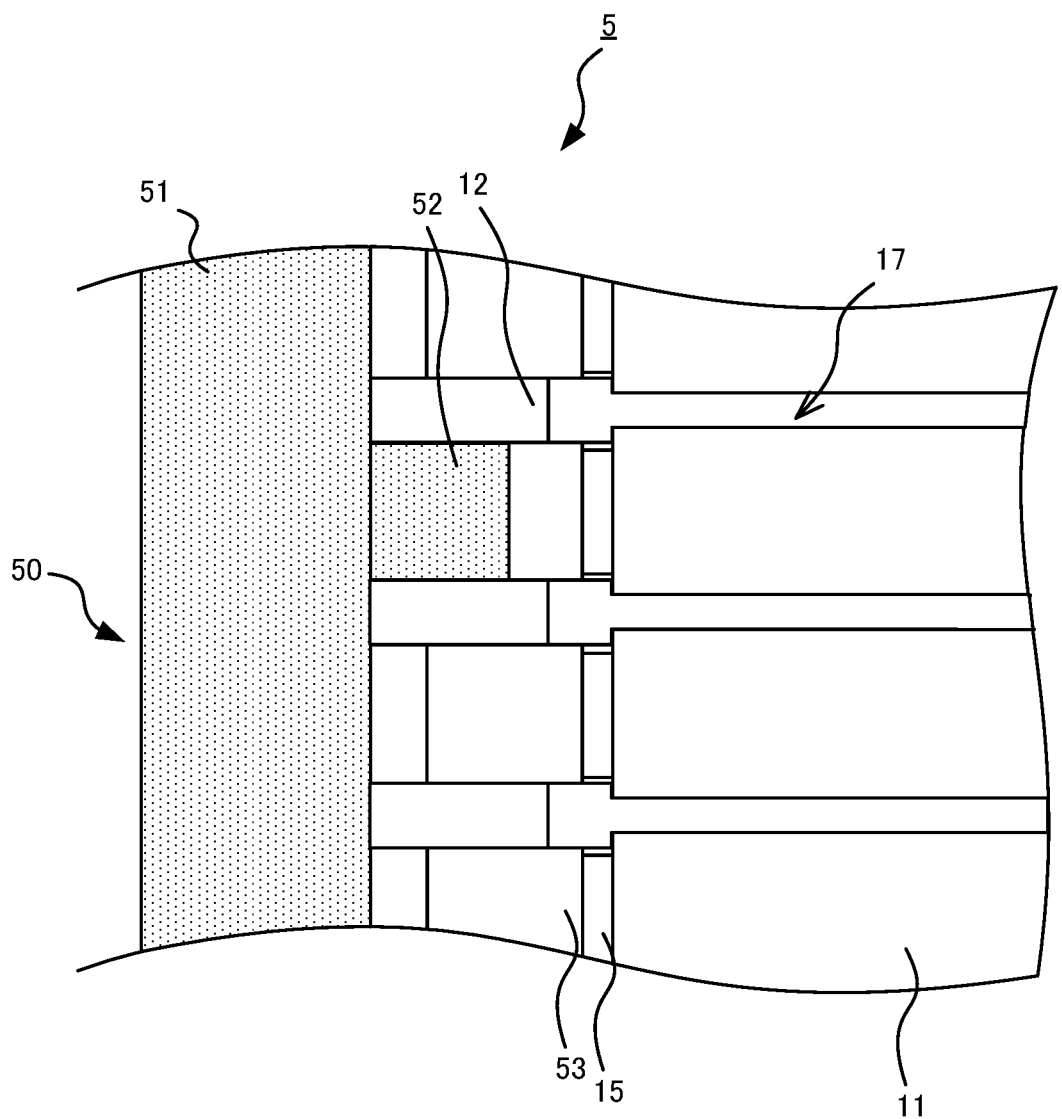
FIG. 16 is an external view of the rotor according to Embodiment 5 viewed in the radial direction.

FIG. 15 is a partial cross-sectional view of a rotor according to Embodiment 5 of the present disclosure. FIG. 15 is a partially enlarged view of a rotor 5 according to Embodiment 5, in the same manner as in FIG. 3. FIG. 16 is an external view of the rotor according to Embodiment 5 viewed in the radial direction. A rotor conductor 50 in the rotor 5 according to Embodiment 5 includes short-circuit rings 51 and deformation prevention portions 52 in place of the short-circuit ring 13 included in the rotor conductor 10 in the rotor 1 according to Embodiment 1. A pair of the short-circuit rings 51 have the main surfaces facing each other in a direction parallel to the rotating shaft 7 across the rotor bars 12, in the same manner as in Embodiment 1. Each short-circuit ring 51 is a conductor bonded to the corresponding ends of the rotor bars 12 to electrically connect the rotor bars 12 together. Each short-circuit ring 51 has an annular cross section perpendicular to the rotating shaft 7. The rotor 5 further includes a core retainer 53 having an annular cross section perpendicular to the rotating shaft. The rotor 5 includes another core retainer (not illustrated) located opposite to the core retainer 53 across the rotor core 11. This core retainer and the core retainer 53 are located across the rotor core 11 via the end plates 15 in the direction along the rotating shaft 7. In the example illustrated in FIG. 15, the core retainer 53 included in the rotor 5 according to Embodiment 5 has a shape different from the shape of the core retainer 14 included in the rotor 1 according to Embodiment 1. The rotor 5 may include the core retainers 14 and 18.

The rotor 5 according to Embodiment 5 includes at least a pair of deformation prevention portions 52 located between the adjacent rotor bars 12 and facing each other across the rotating shaft 7. The deformation prevention portions 52 may be arranged between all adjacent rotor bars 12 or between some adjacent rotor bars 12. Each deformation prevention portion 52 is bonded to the corresponding short-circuit ring 51 and to at least either of the adjacent rotor bars 12 by silver brazing or welding. In the example illustrated in FIG. 16, each deformation prevention portion 52 is bonded to the corresponding short-circuit ring 51 and to each of the adjacent rotor bars 12.

Figure 17:
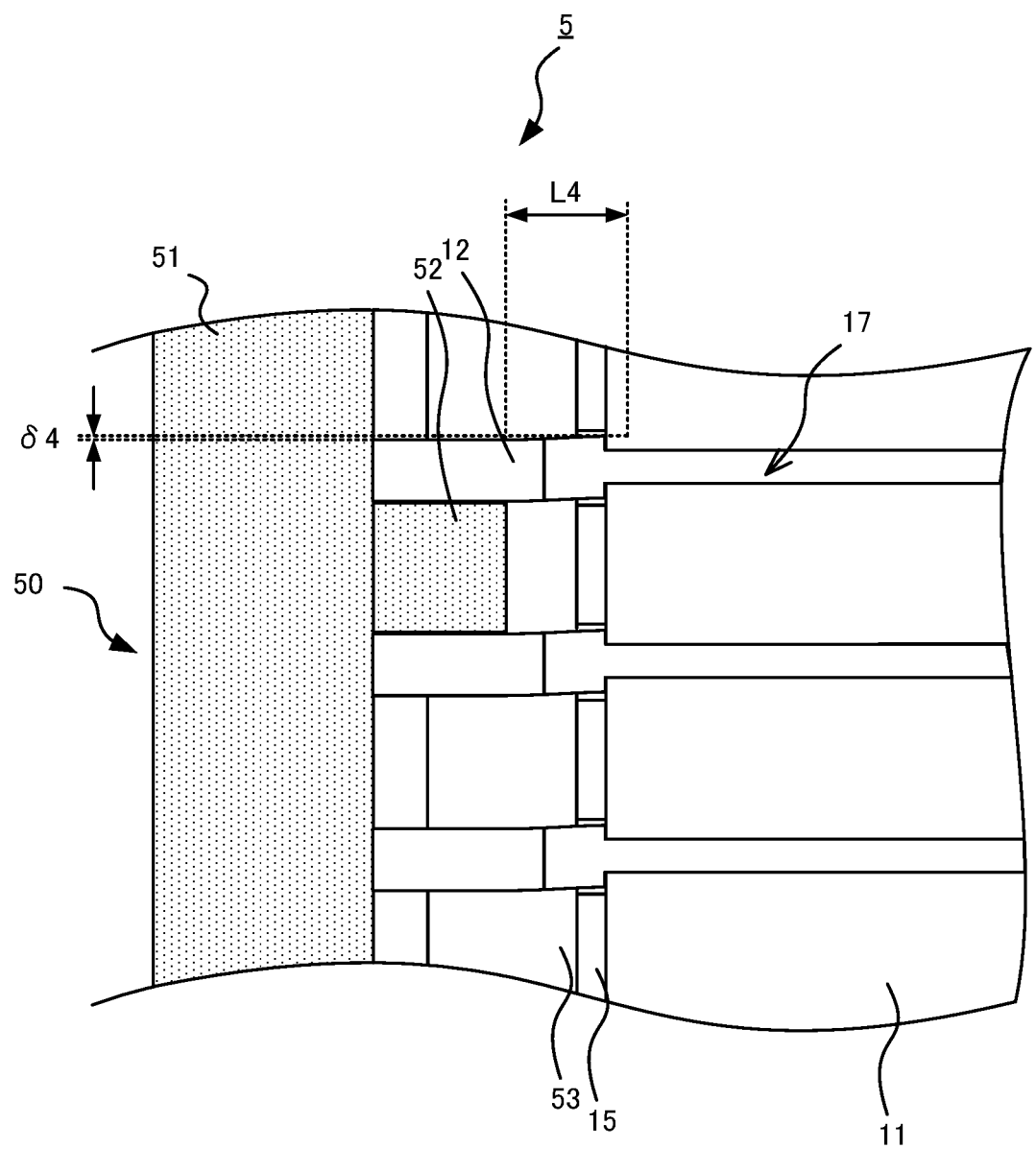
FIG. 17 is a diagram illustrating an example of deformation of a rotor bar in Embodiment 5.

FIG. 17 is a diagram illustrating an example of deformation of a rotor bar in Embodiment 5. When the short-circuit ring 51 is twisted against the rotor core 11 in the rotational direction about the rotating shaft 7, the rotor bar 12 partially bends and deforms in the direction tangent to the outer peripheral surface of the rotor core 11 in accordance with the torsion of the short-circuit ring 51. In the example illustrated in FIG. 17, a portion of the rotor bar 12 deforms for a length L4 to a position inside the slot 17 from an end of the portion near the rotor core 11 along which the rotor bar 12 and the deformation prevention portion 52 are bonded together. The inclusion of the deformation prevention portion 52 prevents the portion of the rotor bar 12 bonded to the deformation prevention portion 52 from deforming. In the example illustrated in FIG. 17, the end of the rotor bar 12 has a displacement δ4 in the direction tangent to the outer peripheral surface of the rotor core 11. The length L4 is shorter than the length L1. The displacement δ4 is smaller than the displacement δ1.

The deformation prevention portions 52 are smaller than the deformation prevention portions 16 included in the rotor 1 according to Embodiment 1. Thus, the inertial moment J remains unchanged although the deformation prevention portions 52 are formed. When the number of the rotor bars 12 to which the deformation prevention portions 52 are bonded is Z1 and the length L4 of the deformed portion of the rotor bar 12 is, for example, 0.6 times the length L1, the torsional natural frequency f2 of the rotor conductor 50 is expressed by Formula 7 below.

Formula 7

$$f2 = \frac{1}{2\pi} \cdot \sqrt{\frac{12 \cdot E \cdot I \cdot Z \cdot R^2}{J \cdot L1^3}\left\{1 + \frac{Z1}{Z} \cdot \left(\frac{1}{0.6^3} - 1\right)\right\}} \quad (7)$$

When the deformation prevention portions 52 are bonded to all the rotor bars 12, Z1 is Z and f2 is 2.15 times the torsional natural frequency f0 of the rotor conductor 60 expressed by Formula 5. The bonding of the deformation prevention portions 52 to at least a portion of the rotor bars 12 reduces bending deformation of the at least portion of the rotor bars 12. The inclusion of the deformation prevention portion 52 may shorten the deformed portion of the rotor bar 12 and increase the torsional natural frequency of the rotor conductor 50. This prevents the rotor conductor 50 in the rotor 5 from resonating, and thus reduces the likelihood of the rotor conductor 50 being subjected to excess stress.

Figure 18:
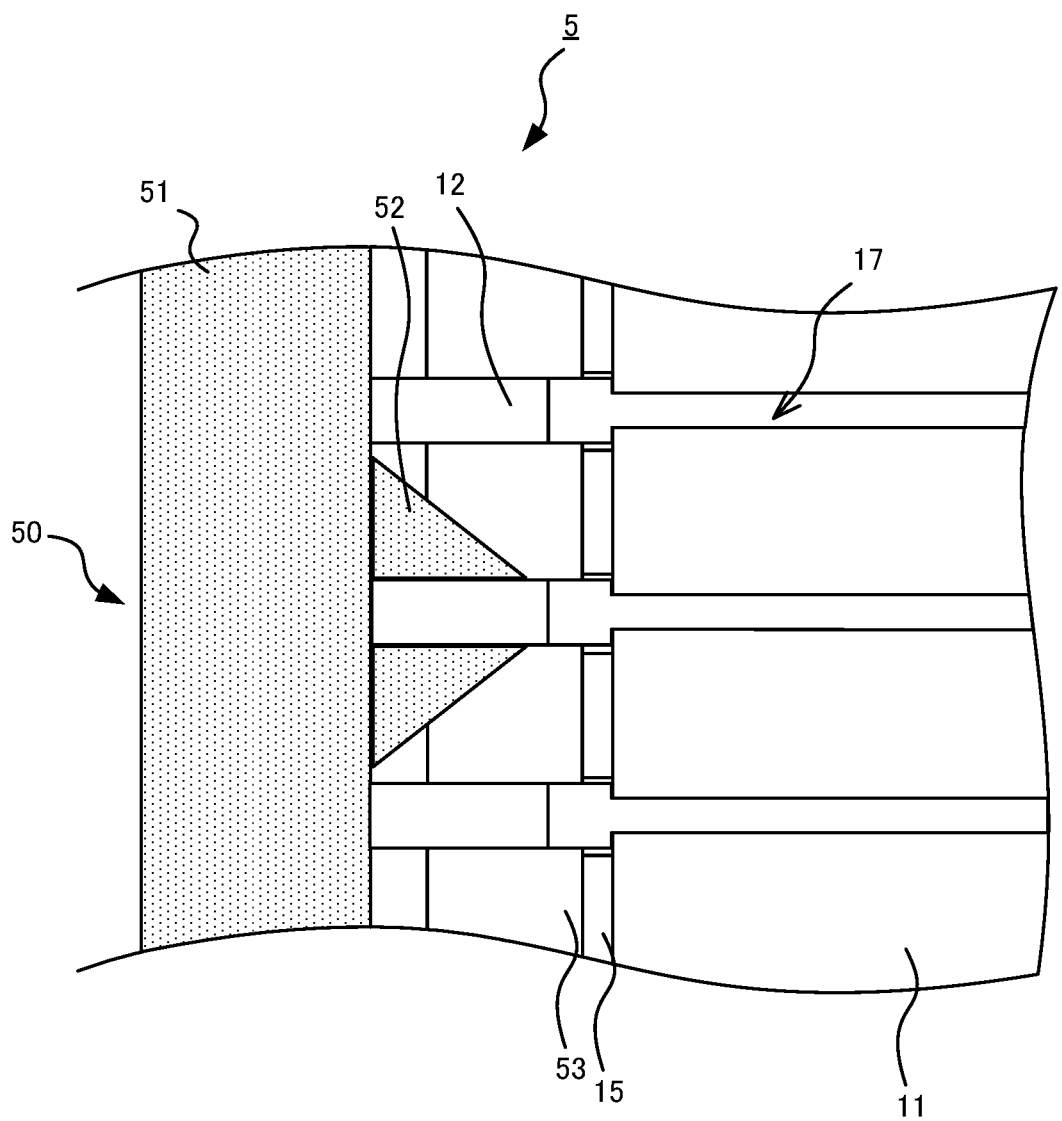
FIG. 18 is an external view of the rotor according to Embodiment 5 viewed in the radial direction.

The deformation prevention portions 52 may have a shape other than the shape described above. The deformation prevention portions 52 may be V-shaped, U-shaped, or L-shaped as viewed from the outside in the radial direction. FIG. 18 is an external view of the rotor according to Embodiment 5 viewed in the radial direction. In the example illustrated in FIG. 18, each deformation prevention portion 52 is triangular as viewed from the outside in the radial direction, and each deformation prevention portion 52 is bonded to the corresponding short-circuit ring 51 and to either of the adjacent rotor bars 12. The deformation prevention portions 52 may be arranged between all adjacent rotor bars 12 or between some adjacent rotor bars 12, in the same manner as in the example described above.

An interval W5 between the deformation prevention portion 52 and the end plate 15 may be half or less than half the thickness W0 of the end plate 15 in the direction along the rotating shaft 7, in the same manner as in Embodiment 1. The interval W5 between the deformation prevention portion 52 and the end plate 15 is reduced to half or less than half the thickness W0 of the end plate 15 in the direction along the rotating shaft 7 thereby reducing the displacement of the rotor bar 12 from the rotor core 11 in the direction along the rotating shaft 7 to half or less than half the thickness of the end plate 15 in the direction along the rotating shaft 7, thus suppressing the vibration from increasing due to the displacement of the rotor bar 12.

Figure 19:
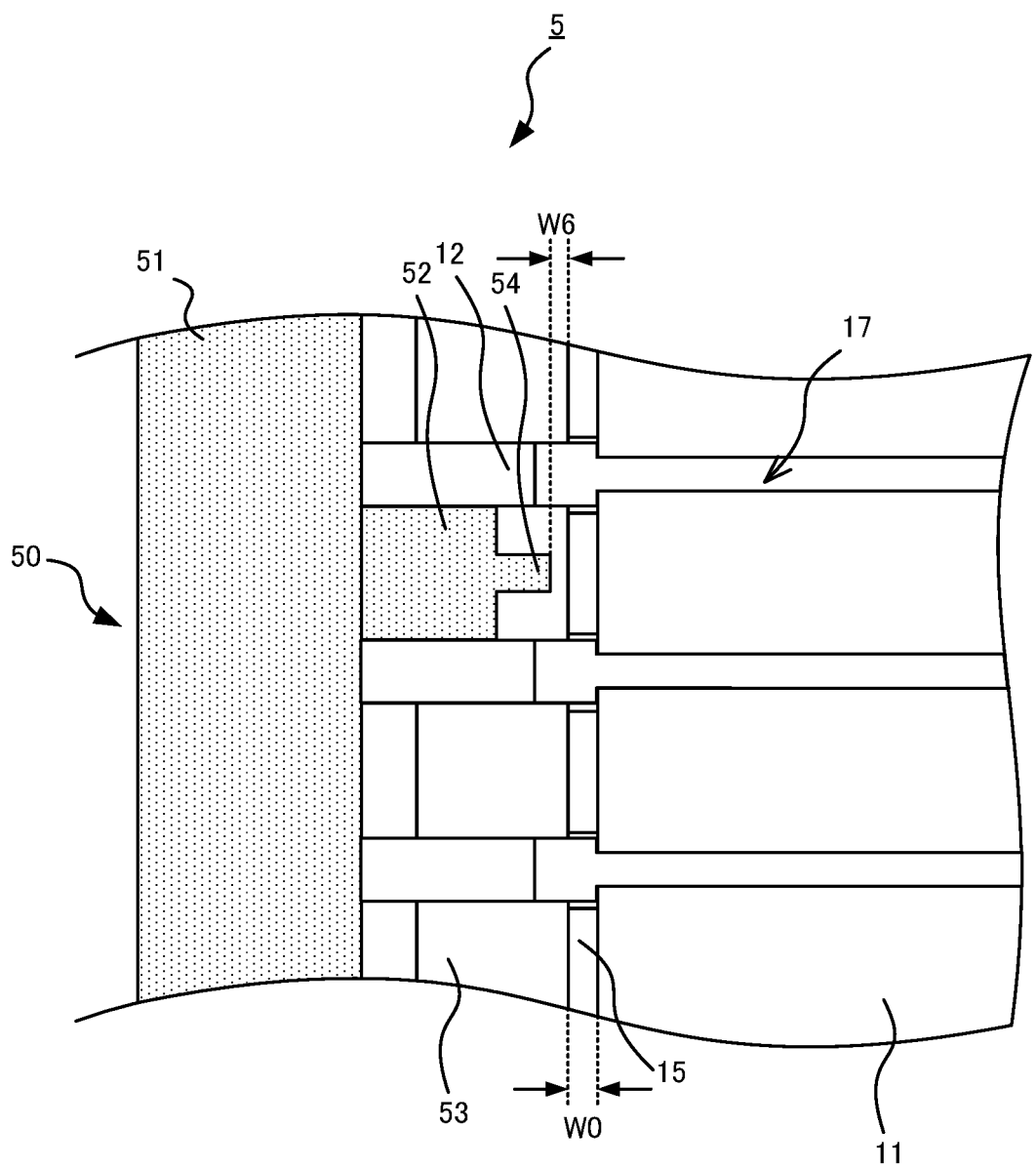
FIG. 19 is an external view of the rotor according to Embodiment 5 viewed in the radial direction.

FIG. 19 is an external view of the rotor according to Embodiment 5 viewed in the radial direction. In the example illustrated in FIG. 19, each deformation prevention portion 52 includes a protrusion 54 protruding from a surface facing the rotor core 11 toward the rotor core 11. When the deformation prevention portion 52 includes the protrusion 54 as in the example of FIG. 19, an interval W6 between the protrusion 54 and the end plate 15 is half or less than half the thickness W0 of the end plate 15 in the direction along the rotating shaft 7. This may reduce the displacement of the rotor bar 12 relative to the rotor core 11 in the direction along the rotating shaft 7 to half or less than half the interval between the protrusion 54 and the end plate 15, suppressing the vibration from increasing due to the displacement of the rotor bar 12.

As described above, the squirrel cage induction motor for a vehicle according to Embodiment 5 of the present disclosure includes the deformation prevention portions 52 in the rotor 5 thereby reducing the likelihood of the rotor bar 12 being subjected to excess stress. The interval W5 between the deformation prevention portion 52 and the end plate 15 is reduced to half or less than half the thickness W0 of the end plate 15 in the direction along the rotating shaft 7 thereby suppressing the vibration from increasing due to the displacement of the rotor bar 12. Further, the protrusion 54 is formed in the deformation prevention portion 52 and the interval W6 between the protrusion 54 and the end plate 15 is reduced to half or less than half the thickness W0 of the end plate 15 in the direction along the rotating shaft 7, thereby suppressing the vibration from increasing due to the displacement of the rotor bar 12.

Embodiments of the present disclosure are not limited to the above described embodiments. The deformation prevention portions 16, 22, and 32 may include the protrusion 54.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5, 6 Rotor
7 Rotating shaft
10, 20, 30, 40, 50, 60 Rotor conductor
11, 61 Rotor core
12, 42, 62 Rotor bar
13, 21, 31, 41, 51, 63 Short-circuit ring
14, 18, 53, 64 Core retainer
15, 65 End plate
16, 22, 32, 52 Deformation prevention portion
17, 33, 66 Slot
54 Protrusion

The invention claimed is:
1. A squirrel cage induction motor for a vehicle, the motor comprising:
   a rotating shaft supported in a rotatable manner;
   a rotor fitted on the rotating shaft and rotatable integrally with the rotating shaft; and
   a stator facing an outer peripheral surface of the rotor across a space,
   the rotor including
      a rotor core fitted on the rotating shaft, the rotor core being a cylinder coaxial with the rotating shaft, the rotor core having a plurality of slots on an outer periphery of the cylinder, the slots extending parallel to the rotating shaft, a plurality of conductive rotor bars each received in one of the slots on the outer periphery of the rotor core, the plurality of rotor bars each having two ends in a direction parallel to the rotating shaft protruding outwardly from the rotor core, a pair of conductive short-circuit rings having respective main surfaces facing each other across the plurality of rotor bars in a direction parallel to the rotating shaft, the pair of short-circuit rings each being bonded to the end faces of the plurality of rotor bars to electrically connect the plurality of rotor bars together, each short-circuit ring having an annular cross section perpendicular to the rotating shaft, a pair of core retainers located across the rotor core in a direction along the rotating shaft to reduce movement and deformation of the rotor core in the direction along the rotating shaft, each core retainer having an annular cross section perpendicular to the rotating shaft, and a deformation prevention portion located between a corresponding one of the short-circuit rings and the rotor core, at least part of the deformation prevention portion facing an outer peripheral surface of a corresponding one of the core retainers and fixed to the corresponding one of the short-circuit rings and to at least a portion of an inner peripheral surface of at least one of the rotor bars to reduce bending deformation of the at least a portion of the at least one of the rotor bars in a direction tangent to an outer peripheral surface of the rotor core, wherein an end of the deformation prevention portion nearest to the rotor core in the direction along the rotating shaft is located closer to the rotor core than an end of the outer peripheral surface of the short-circuit ring nearest to the rotor core in the direction along the rotating shaft, and the deformation prevention portion has an annular cross section perpendicular to the rotating shaft.

2. The squirrel cage induction motor according to claim 1, wherein the end of the deformation prevention portion nearest to the rotor core in a direction along the rotating shaft is located radially outward from the outer peripheral surface of the core retainer.

3. The squirrel cage induction motor according to claim 2, wherein
the deformation prevention portion has (i) an outer peripheral surface fixed to the at least a portion of the at least one of the rotor bars including the ends, (ii) an inner peripheral surface at least partially facing the outer peripheral surface of the corresponding one of the core retainers, and (iii) a surface facing and being fixed to the corresponding one of the short-circuit rings.

4. The squirrel cage induction motor according to claim 3, wherein
the deformation prevention portion includes a protrusion protruding from a surface facing the rotor core toward the rotor core.

5. The squirrel cage induction motor according to claim 3, further comprising:
an end plate located between the core retainer and the rotor core,
wherein an interval between the deformation prevention portion and the end plate is half or less than half a thickness of the end plate in the direction along the rotating shaft.

6. The squirrel cage induction motor according to claim 2, wherein
the deformation prevention portion has, on the outer periphery, a plurality of second slots corresponding one-to-one to the rotor bars,
the second slots extend parallel to the rotating shaft,
the second slots receive only the inner peripheral surface of the rotor bar and portions of side surfaces of the rotor bar that extend along the rotating shaft and are continuous to the inner peripheral surface of the rotor bar, and
the deformation prevention portion has an inner peripheral surface at least partially facing the outer peripheral surface of the corresponding one of the core retainers, and has a surface facing and being fixed to the corresponding one of the short-circuit rings.

7. The squirrel cage induction motor according to claim 6, wherein
the deformation prevention portion includes a protrusion protruding from a surface facing the rotor core toward the rotor core.

8. The squirrel cage induction motor according to claim 6, further comprising:
an end plate located between the core retainer and the rotor core,
wherein an interval between the deformation prevention portion and the end plate is half or less than half a thickness of the end plate in the direction along the rotating shaft.

9. The squirrel cage induction motor according to claim 2, wherein
the deformation prevention portion includes a protrusion protruding from a surface facing the rotor core toward the rotor core.

10. The squirrel cage induction motor according to claim 9, further comprising:
an end plate located between the core retainer and the rotor core,
wherein an interval between the deformation prevention portion and the end plate is half or less than half a thickness of the end plate in the direction along the rotating shaft.

11. The squirrel cage induction motor according to claim 2, further comprising:
an end plate located between the core retainer and the rotor core,
wherein an interval between the deformation prevention portion and the end plate is half or less than half a thickness of the end plate in the direction along the rotating shaft.

12. The squirrel cage induction motor according to claim 1, wherein
the deformation prevention portion has (i) an outer peripheral surface fixed to the at least a portion of the at least one of the rotor bars including the ends, (ii) an inner peripheral surface at least partially facing the outer peripheral surface of the corresponding one of the core retainers, and (iii) a surface facing and being fixed to the corresponding one of the short-circuit rings.

13. The squirrel cage induction motor according to claim 12, wherein the deformation prevention portion includes a protrusion protruding from a surface facing the rotor core toward the rotor core.

14. The squirrel cage induction motor according to claim 12, further comprising:
an end plate located between the core retainer and the rotor core,
wherein an interval between the deformation prevention portion and the end plate is half or less than half a thickness of the end plate in the direction along the rotating shaft.

15. The squirrel cage induction motor according to claim 1, wherein
the deformation prevention portion has, and has, on the outer periphery, a plurality of second slots corresponding one-to-one to the rotor bars,
the second slots extend parallel to the rotating shaft,
the second slots receive only the inner peripheral surface of the rotor bar and portions of side surfaces of the rotor bar that extend along the rotating shaft and are continuous to the inner peripheral surface of the rotor bar, and
the deformation prevention portion has an inner peripheral surface at least partially facing the outer peripheral surface of the corresponding one of the core retainers, and has a surface facing and being fixed to the corresponding one of the short-circuit rings.

16. The squirrel cage induction motor according to claim 15, wherein
the deformation prevention portion includes a protrusion protruding from a surface facing the rotor core toward the rotor core.

17. The squirrel cage induction motor according to claim 15, further comprising:
an end plate located between the core retainer and the rotor core,
wherein an interval between the deformation prevention portion and the end plate is half or less than half a thickness of the end plate in the direction along the rotating shaft.

18. The squirrel cage induction motor according to claim 1, wherein
the deformation prevention portion includes a protrusion protruding from a surface facing the rotor core toward the rotor core.

19. The squirrel cage induction motor according to claim 18, further comprising:
an end plate located between the core retainer and the rotor core,
wherein an interval between the deformation prevention portion and the end plate is half or less than half a thickness of the end plate in the direction along the rotating shaft.

20. The squirrel cage induction motor according to claim 1, further comprising:
an end plate located between the core retainer and the rotor core,
wherein an interval between the deformation prevention portion and the end plate is half or less than half a thickness of the end plate in the direction along the rotating shaft.

* * * * *